US 6,655,134 B2

(12) United States Patent  
Nakayasu et al.

(10) Patent No.: US 6,655,134 B2
(45) Date of Patent: Dec. 2, 2003

(54) EXHAUST CONTROL VALVE

(75) Inventors: Tetsuya Nakayasu, Saitama (JP); Mikio Sagara, Saitama (JP); Kyo Takahashi, Saitama (JP); Noritoshi Iwase, Saitama (JP); Hajime Yamada, Saitama (JP); Atsushi Murakami, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,724

(22) Filed: Mar. 30, 2001

(65) Prior Publication Data

US 2001/0027648 A1 Oct. 11, 2001

(30) Foreign Application Priority Data

Mar. 31, 2000 (JP) ........................................ 2000-101331
Sep. 22, 2000 (JP) ........................................ 2000-289139

(51) Int. Cl.⁷ ................................................ F01N 7/00
(52) U.S. Cl. ........................... 60/324; 60/313; 251/214; 251/305
(58) Field of Search .......................... 60/313, 324, 312; 123/337, 399; 137/625.19; 251/172, 214, 305, 306, 308; 384/218, 271; 403/30

(56) References Cited

U.S. PATENT DOCUMENTS

| 4,632,590 A | * | 12/1986 | Tsuchimoto | 403/30 |
| 4,785,626 A | * | 11/1988 | Shiraishi | 60/313 |
| 4,817,374 A | * | 4/1989 | Kitta | 60/313 |
| 4,877,339 A | * | 10/1989 | Schuster et al. | 384/218 |
| 4,939,898 A | * | 7/1990 | Ichimura et al. | 60/313 |
| 5,401,001 A | * | 3/1995 | Cook et al. | 251/308 |
| 5,490,487 A | * | 2/1996 | Kato et al. | 123/399 |
| 5,503,367 A | * | 4/1996 | Thompson et al. | 251/214 |
| 5,630,571 A | * | 5/1997 | Kipp et al. | 251/214 |
| 6,076,831 A | * | 6/2000 | Pfannenschmidt | 251/214 |
| 6,263,917 B1 | * | 7/2001 | Evans | 251/305 |
| 6,273,058 B1 | * | 8/2001 | Wagner | 251/214 |

FOREIGN PATENT DOCUMENTS

| JP | 63212728 | | 9/1988 |
| JP | 2-37110 | * | 2/1990 |
| JP | 2-75721 | * | 3/1990 |

* cited by examiner

Primary Examiner—Thomas Denion
Assistant Examiner—Tu M. Nguyen
(74) Attorney, Agent, or Firm—Birch, Stewart, Kolasch & Birch, LLP

(57) ABSTRACT

An exhaust control valve has a valve housing and a valve body rotatably contained within the valve housing. The valve body cooperates with the valve housing for controlling the flow of exhaust gas. A transmission member rotationally drives a valve shaft of the valve body. The valve body is formed in a cylindrical shape and coaxially with an axis line of the valve shaft. The valve body and the valve shaft are made from a one-piece body by casting. This arrangement provides an exhaust control valve for an engine having a valve body that provides excellent sealing properties, demonstrates high response to driving torque and is easy to manufacture through casting.

16 Claims, 20 Drawing Sheets

EXHAUST CONTROL VALVE

BACKGROUND OF THE INVENTION

1. Field of the Invention

The present invention relates to an exhaust control valve for controlling the flow of exhaust gas, and more particularly to an exhaust control valve for a motor vehicle exhaust gas system.

2. Background Art

In an exhaust control valve according to the background art as shown in Japanese Pre-examination Patent Publication (KOKAI) No. 63-212728 (1988), a cast valve having a crank-like shape has the flow of exhaust gas controlled by a crank portion.

However, this crank-like valve body suffers from some disadvantages. Since the shape of the valve body is asymmetrical with respect to the axis line of the valve shaft, distribution of melt is often defective at the time of casting from an end of the valve shaft, and thermal deformation due to partial material thickness can easily occur. In addition, since the crank portion serving as a valve portion makes contact with the valve housing over a small area, it is difficult to maintain high sealing properties. Further, since the weight balance about the axis line of the valve body is offset/poor, response to driving torque is relatively poor.

SUMMARY OF THE INVENTION

The present invention overcomes the shortcomings associated with the background art and achieves other advantages not realized by the background art.

An aspect of the present invention is to provide an exhaust control valve which solves the afore-mentioned drawbacks of the background art, specifically to provide high sealing properties, improve thermal properties through improved casting integrity, and desirable weight distribution.

These and other aspects of the present invention are accomplished by an exhaust control valve comprising a valve housing having a valve chamber; a valve body having a cylindrical shape rotatably contained in the valve chamber and cooperatively engaged with the valve housing for controlling a flow of exhaust gas; a transmission member rotationally driving at least one valve shaft of the valve body; and a plurality of bearing bushings mounted in the valve housing and rotatably supporting each valve shaft, wherein the valve body is coaxially arranged with an axial centerline of each valve shaft.

Since the valve body and the valve shaft have a coaxial cylindrical shape, it is possible to obtain good distribution of melt from a central portion of an end of the valve shaft at the time of casting, and to prevent thermal deformation from occurring due to partial material thickness. Accordingly, the external peripheral surfaces of the valve body and the valve shaft can be finished by cutting continuously after casting. Therefore, the valve body can be manufactured with high precision efficiently.

The high-precision valve body can have its external peripheral surface in thorough contact with the internal surface of the valve housing, so that it is possible to effectively restrain leakage of exhaust gas at the contact area and to carry out appropriate exhaust control. Further, since the cylindrical valve body has good weight balance about the axis line, it is possible to achieve a reduction of driving torque for the valve body and, hence, enhancement of response to the driving torque. Also, it is possible to minimize non-uniform loading on the bearing bushes, thereby contriving improved durability of the bearing bushes.

These and other aspects of the present invention are further accomplished by an exhaust control system for an internal combustion engine of a vehicle comprising a plurality of exhaust pipes from the internal combustion engine containing an exhaust gas flow, the exhaust pipes each having an intermediate portion; a common valve housing interposed in the intermediate portions of the exhaust pipes, the valve housing having at least one pair of inlet ports, at least one pair of outlet ports, and a valve chamber; a valve body having a cylindrical shape rotatably mounted within the valve chamber, and cooperatively engaged with the valve housing for controlling a flow of exhaust gas; a transmission member rotationally driving at least one valve shaft of the valve body; and a plurality of bearing bushings mounted in said valve housing and rotatably supporting each valve shaft, wherein the valve body is coaxially arranged with an axial centerline of each valve shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BRIEF DESCRIPTION OF THE PREFERRED EMBODIMENTS

The present invention will now be described with reference to the embodiments illustrated by the accompanying drawings.

Figure 1:
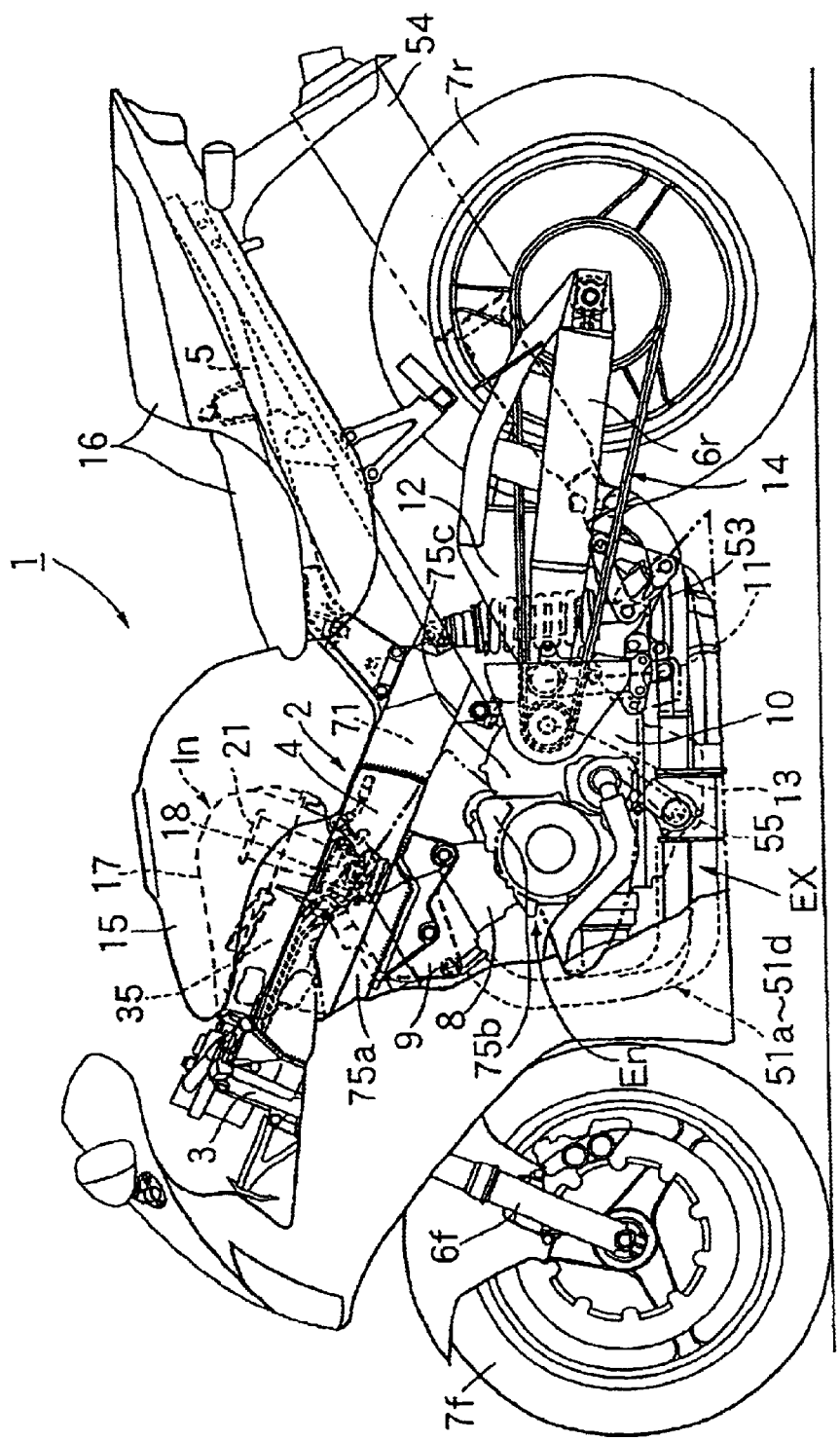
FIG. 1 is a side view of a motorcycle with an engine having an intake control device and an exhaust control device.
Figure 2:
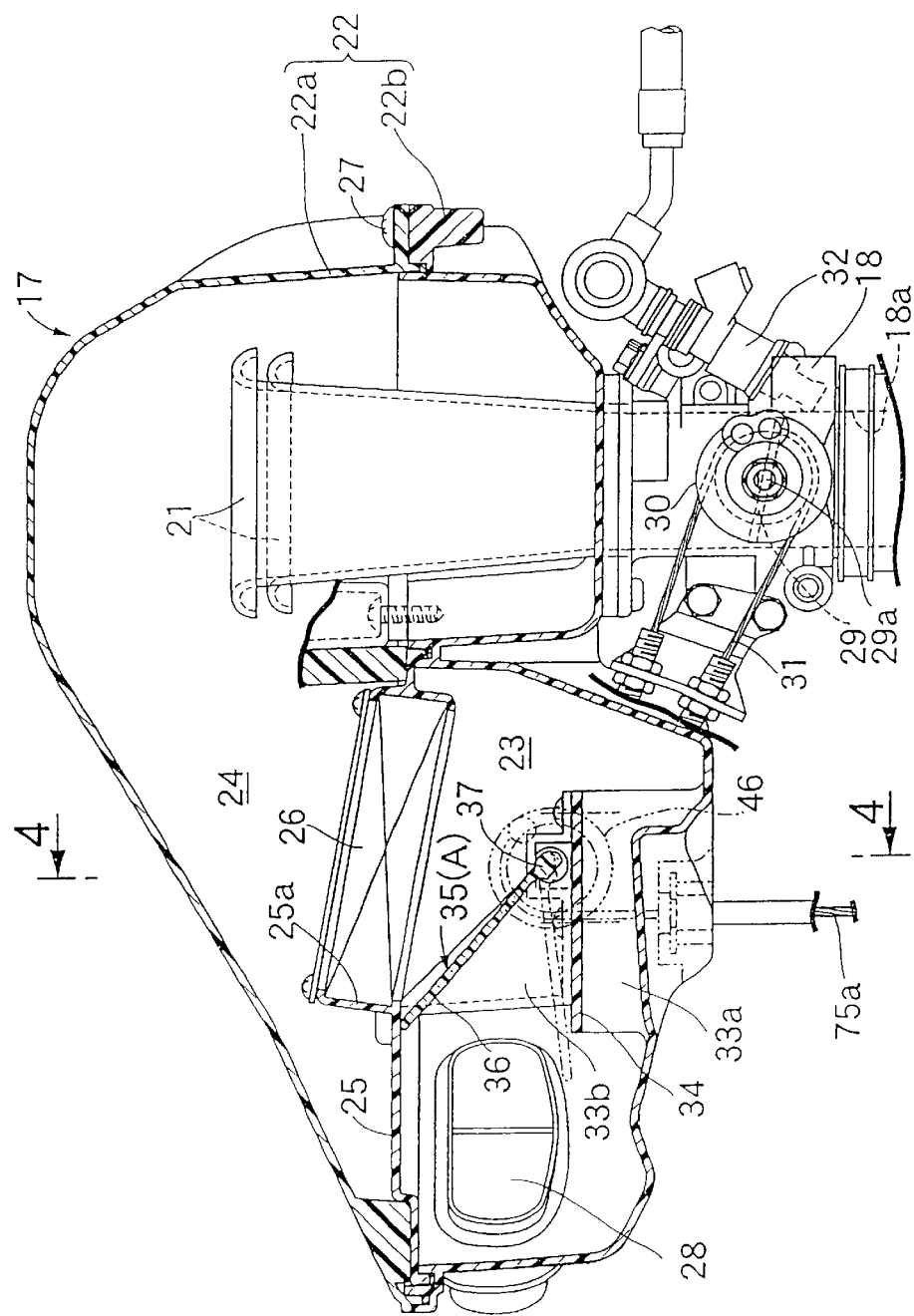
FIG. 2 is a vertical sectional side view of a portion of an intake control device according to an embodiment of the present invention.
Figure 3:
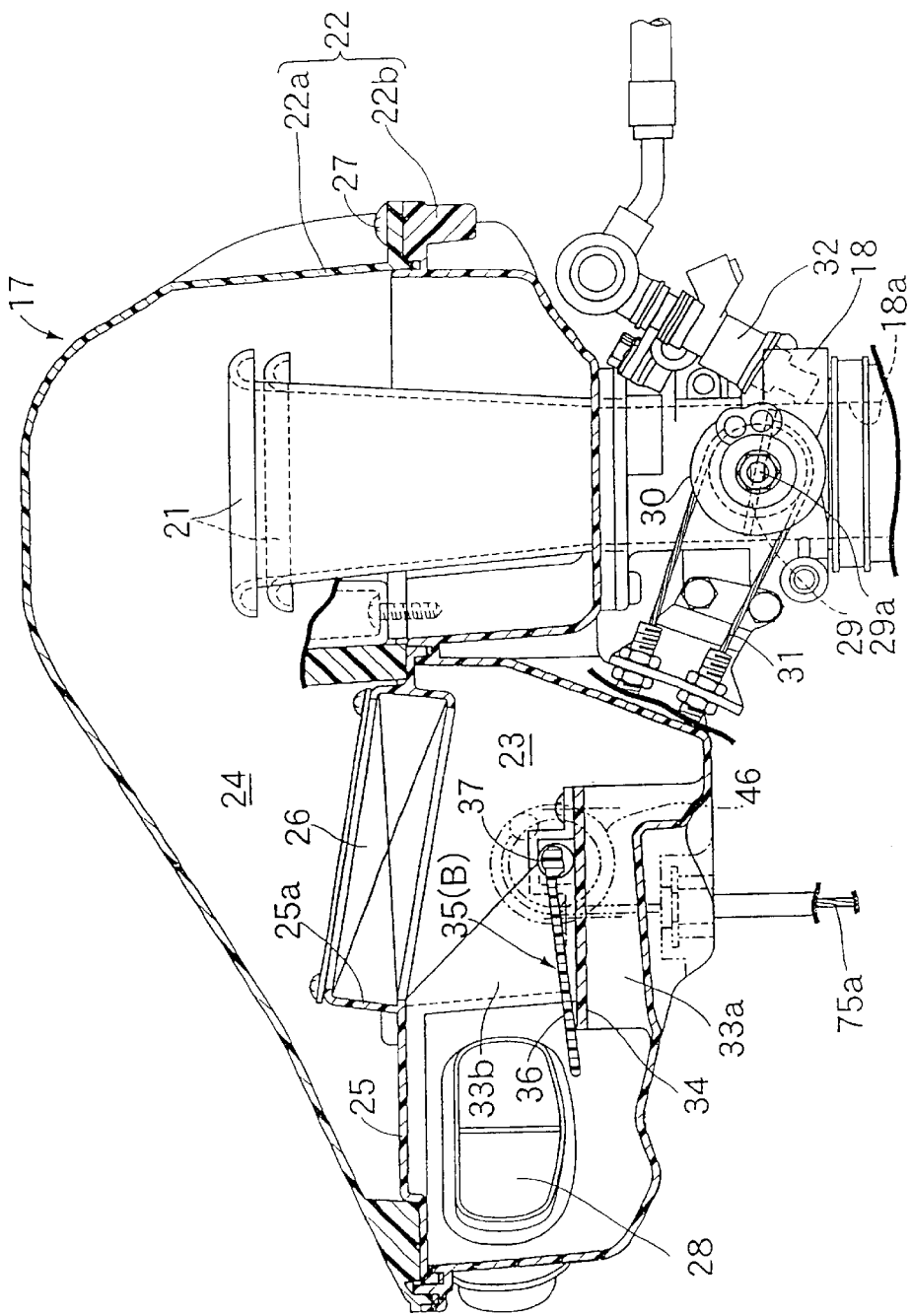
FIG. 3 is a vertical sectional side view of a portion of an intake control device according to an embodiment of the present invention and corresponding to a different operational position than that of FIG. 2.
Figure 4:
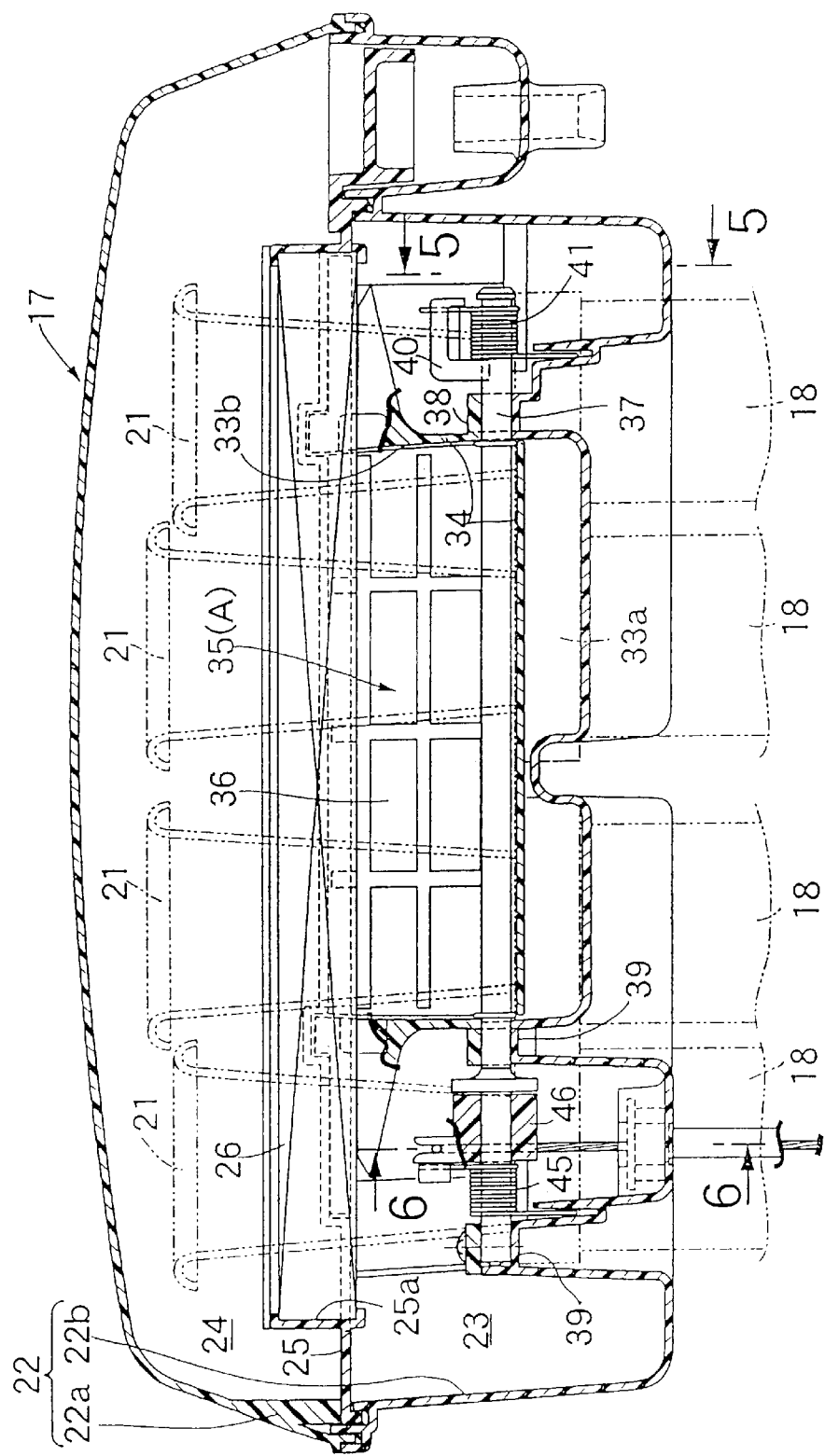
FIG. 4 is a sectional view taken along line 4—4 of FIG. 2 according to an embodiment of the present invention.
Figure 5:
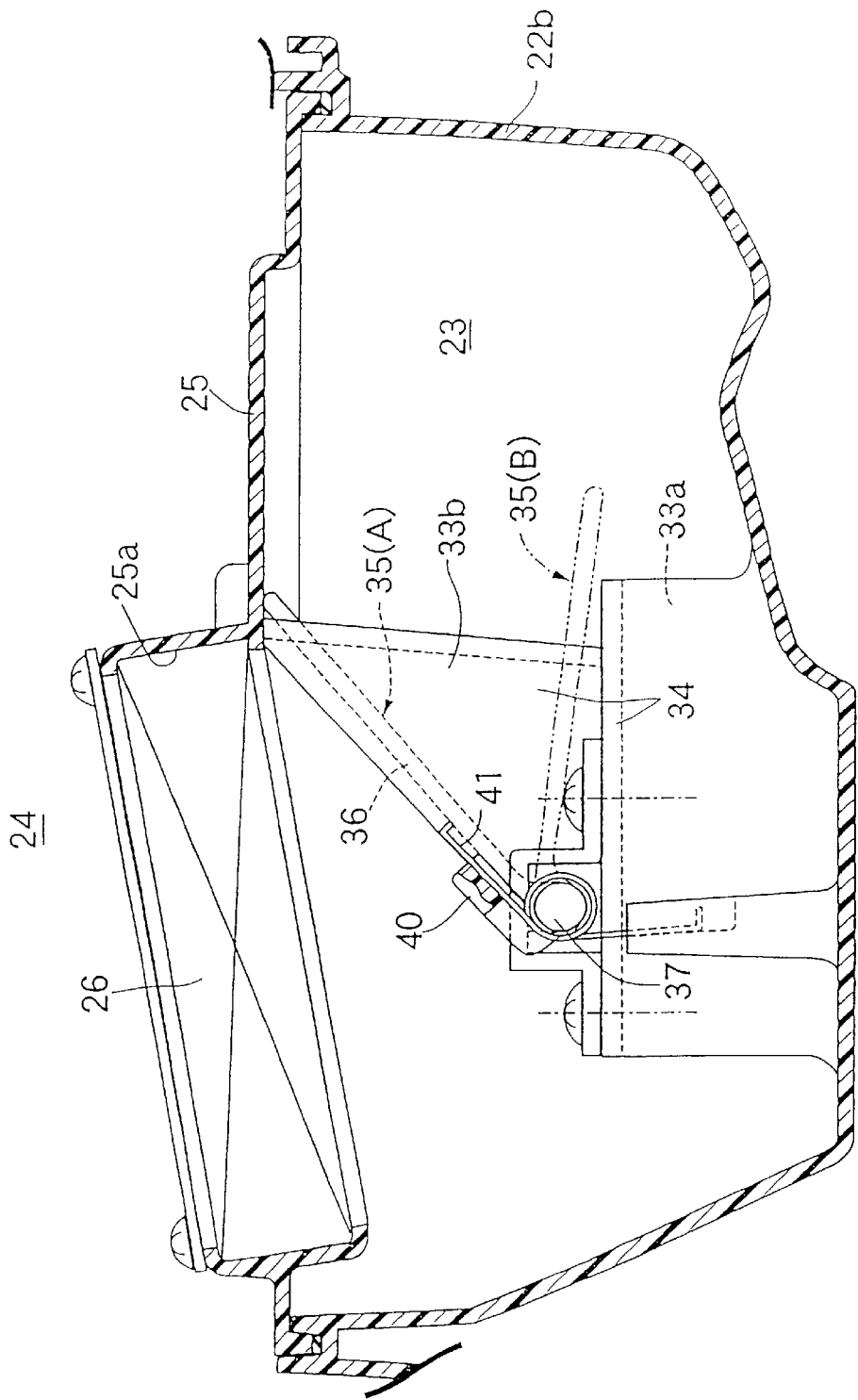
FIG. 5 is a sectional view taken along line 5—5 of FIG. 4 according to an embodiment of the present invention.
Figure 6:
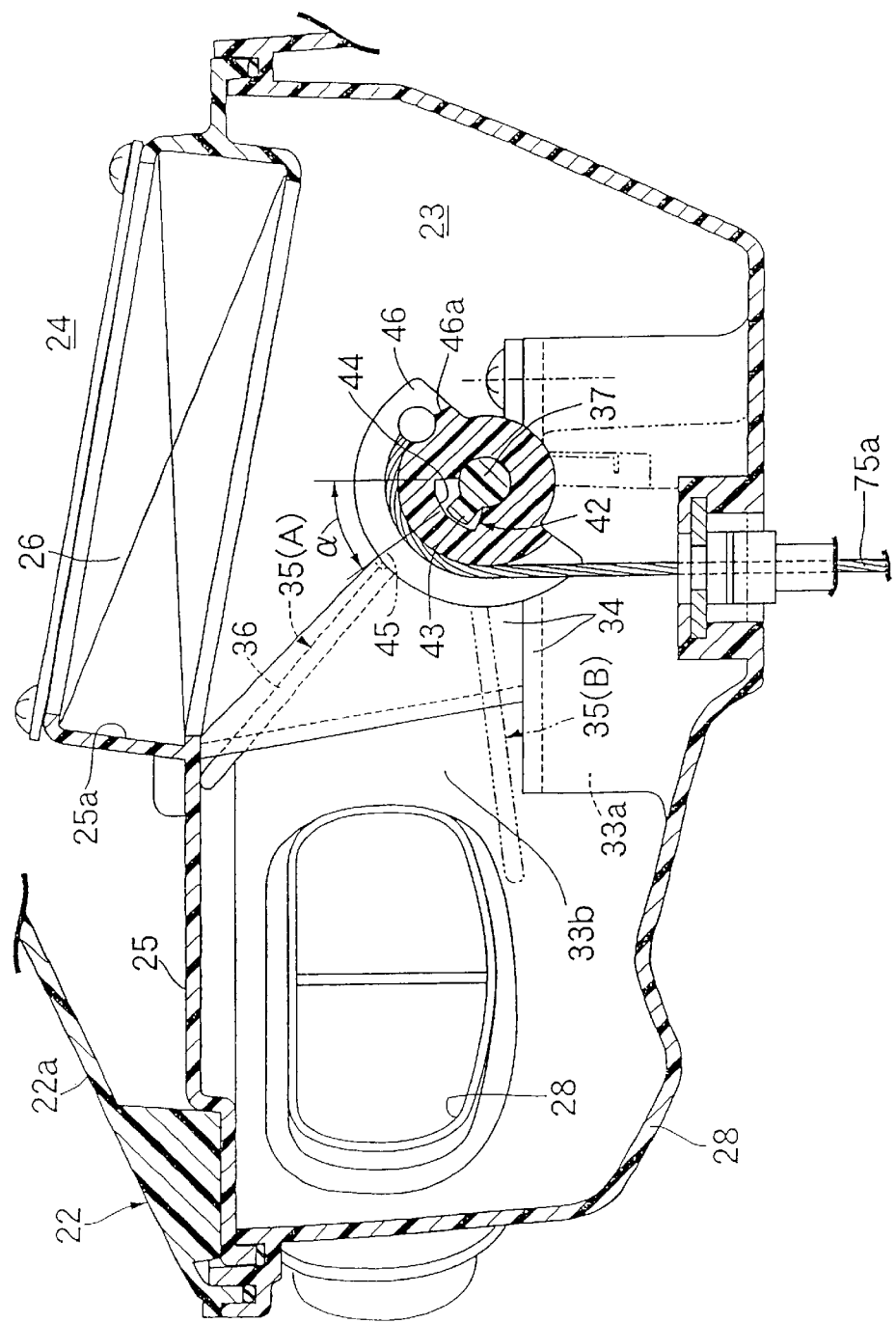
FIG. 6 is a sectional view taken along line 6—6 of FIG. 4 according to an embodiment of the present invention.
Figure 7:
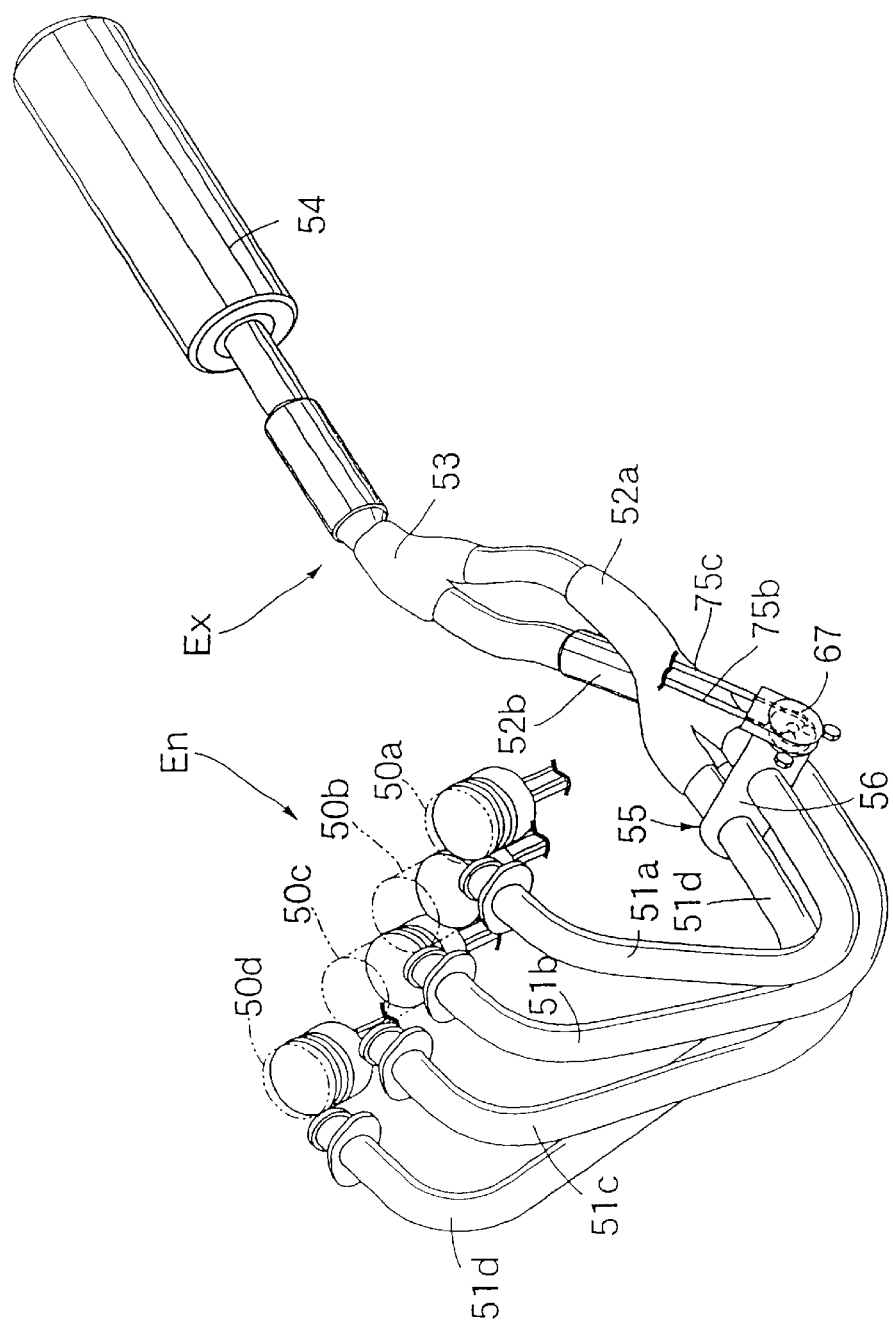
FIG. 7 is a perspective view of an exhaust system according to an embodiment of the present invention.

FIG. 1 is a side view of a motorcycle with an engine having an intake control device and an exhaust control device. FIG. 2 is a vertical sectional side view of a portion of an intake control device according to an embodiment of the present invention. FIG. 3 is a vertical sectional side view of a portion of an intake control device according to an embodiment of the present invention and corresponding to a different operational position than that of FIG. 2. FIG. 4 is a sectional view taken along line 4—4 of FIG. 2 according to an embodiment of the present invention. FIG. 5 is a sectional view taken along line 5—5 of FIG. 4 according to an embodiment of the present invention. FIG. 6 is a sectional view taken along line 6—6 of FIG. 4 according to an embodiment of the present invention. FIG. 7 is a perspective view of an exhaust system according to an embodiment of the present invention.

Figure 8:
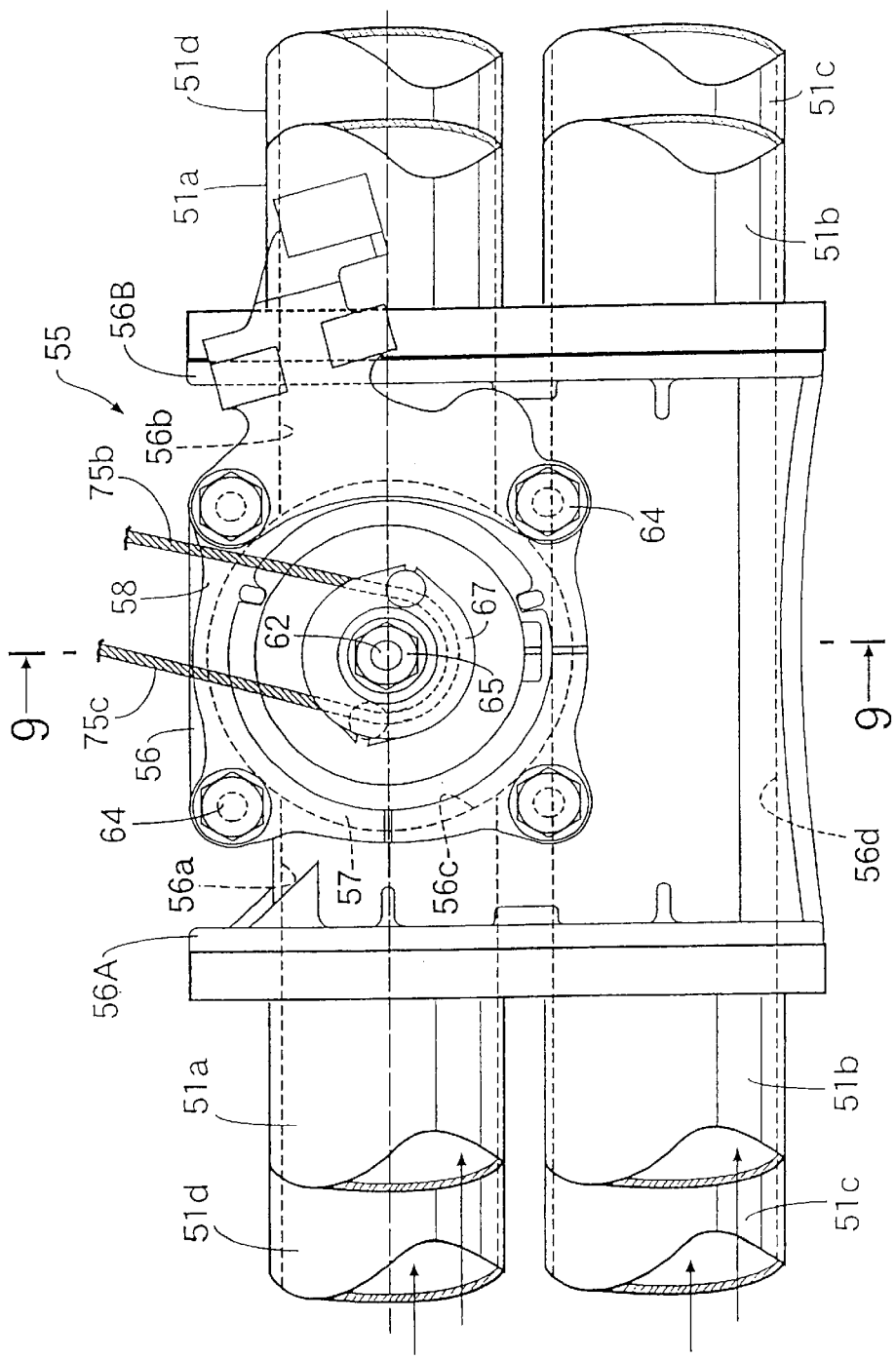
FIG. 8 is a side view of an exhaust control device according to an embodiment of the present invention.
Figure 9:
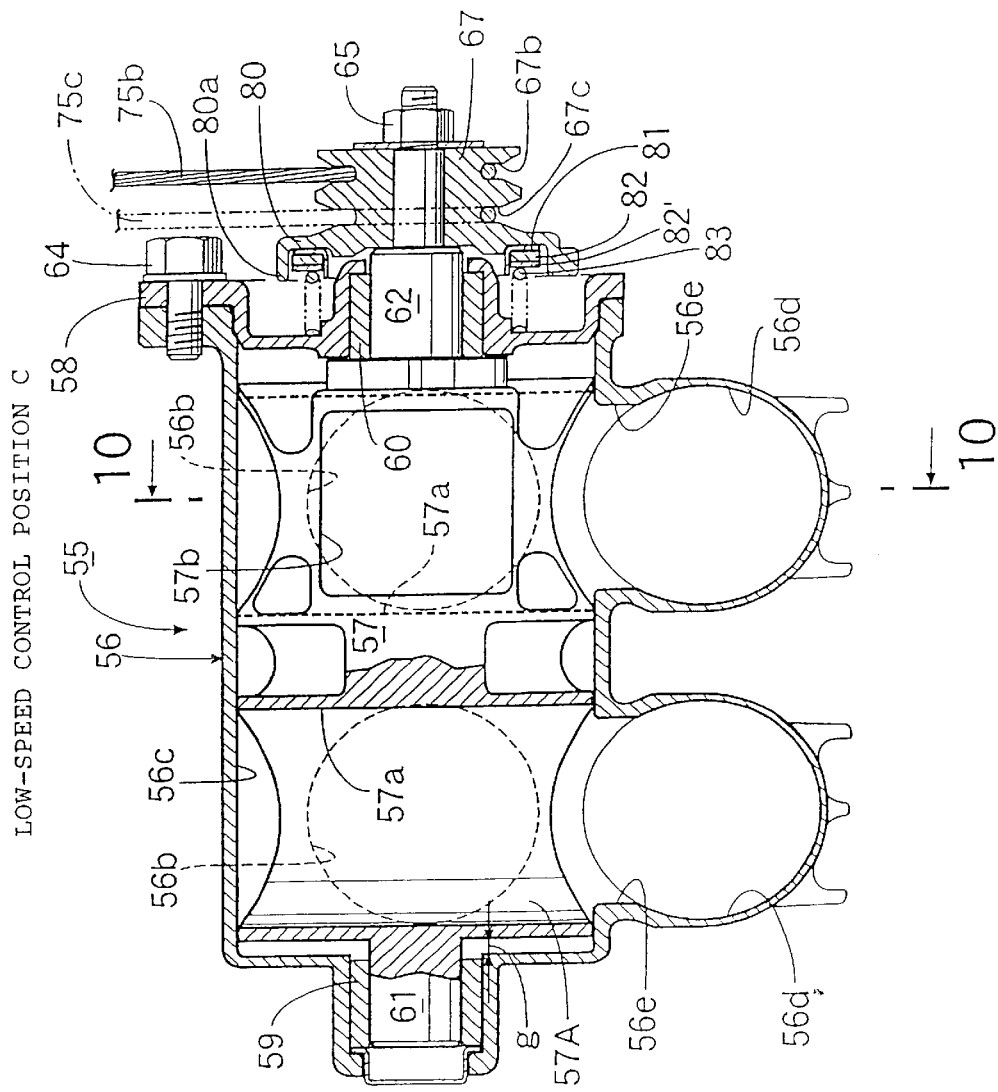
FIG. 9 is a sectional view taken along line 9—9 of FIG. 8 showing an exhaust control valve in its low-speed control position according to an embodiment of the present invention.
Figure 10:
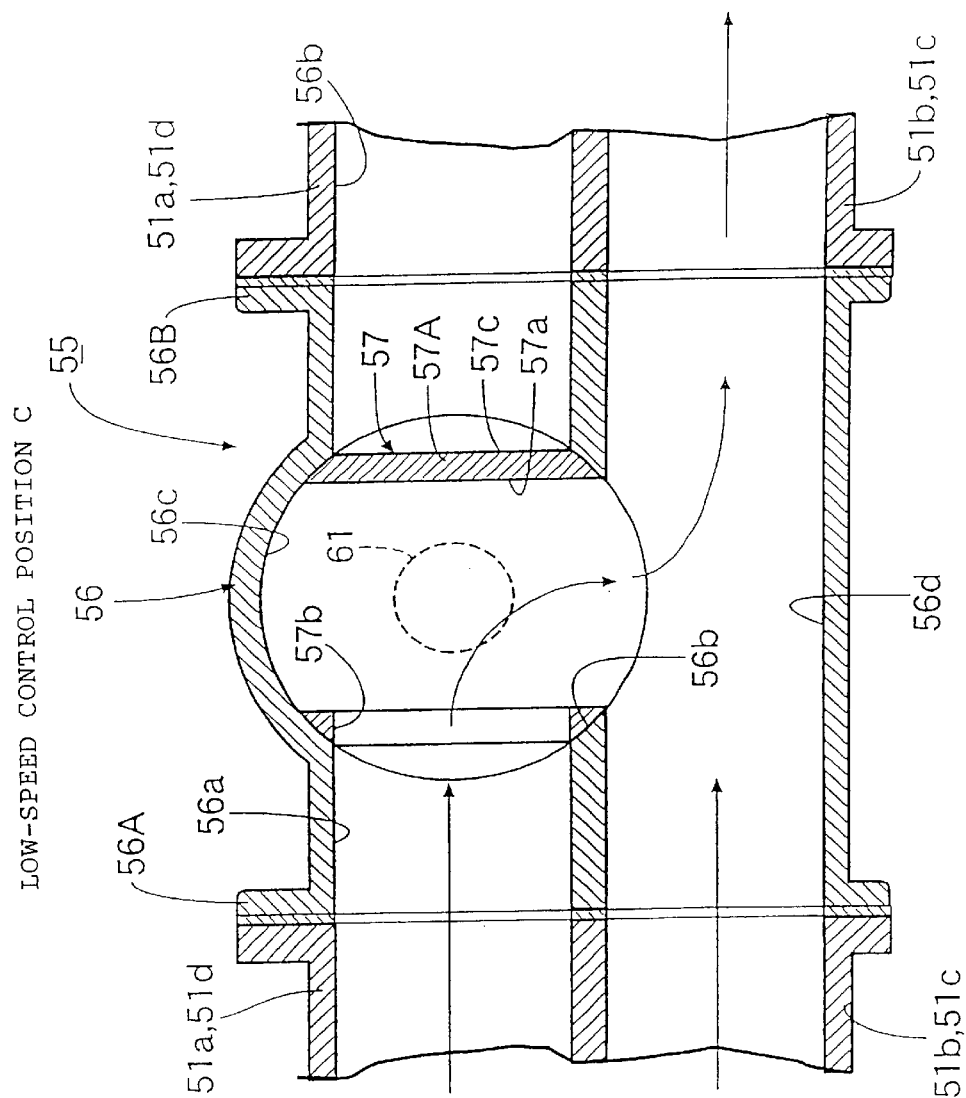
FIG. 10 is a sectional view taken along line 10—10 of FIG. 9 according to an embodiment of the present invention.
Figure 11:
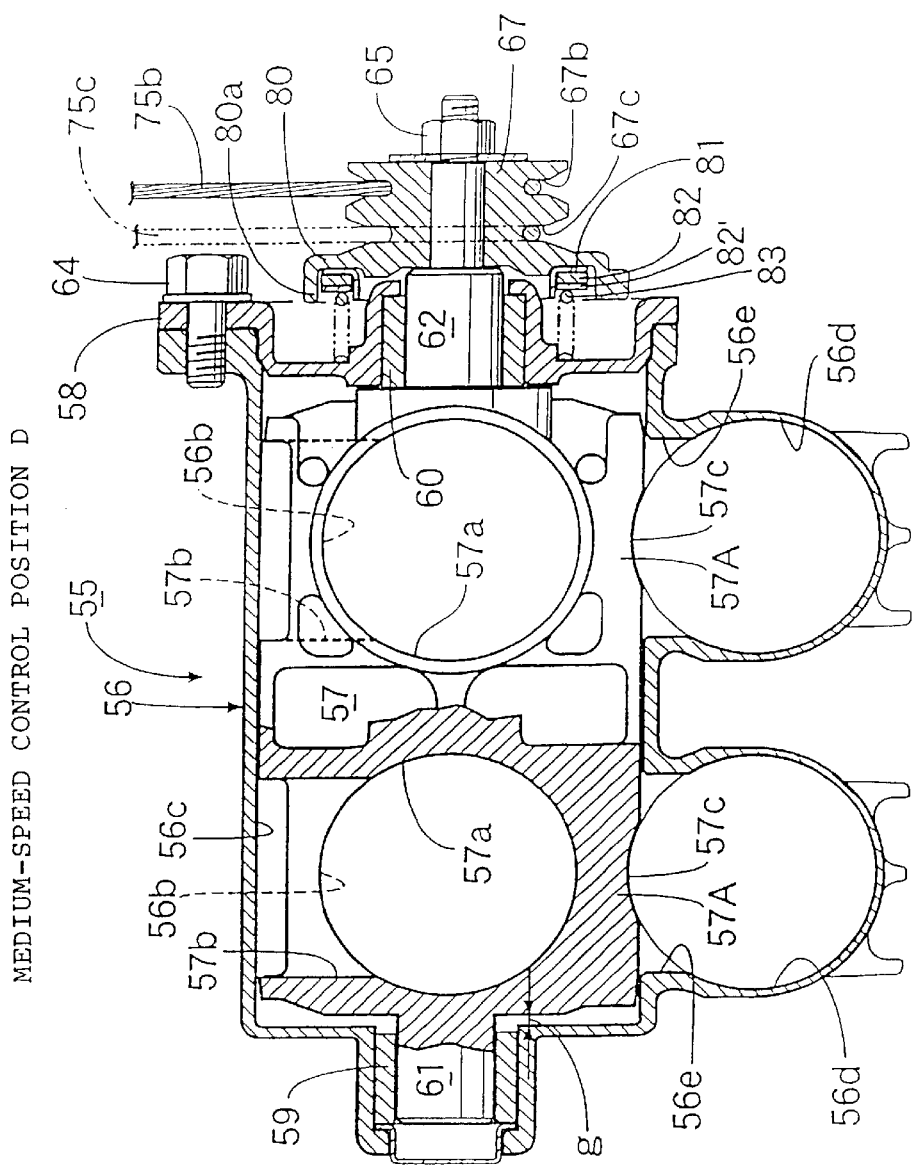
FIG. 11 is a sectional view taken along line 9—9 of FIG. 8 showing an exhaust control valve in its medium-speed control position according to an embodiment of the present invention.
Figure 12:
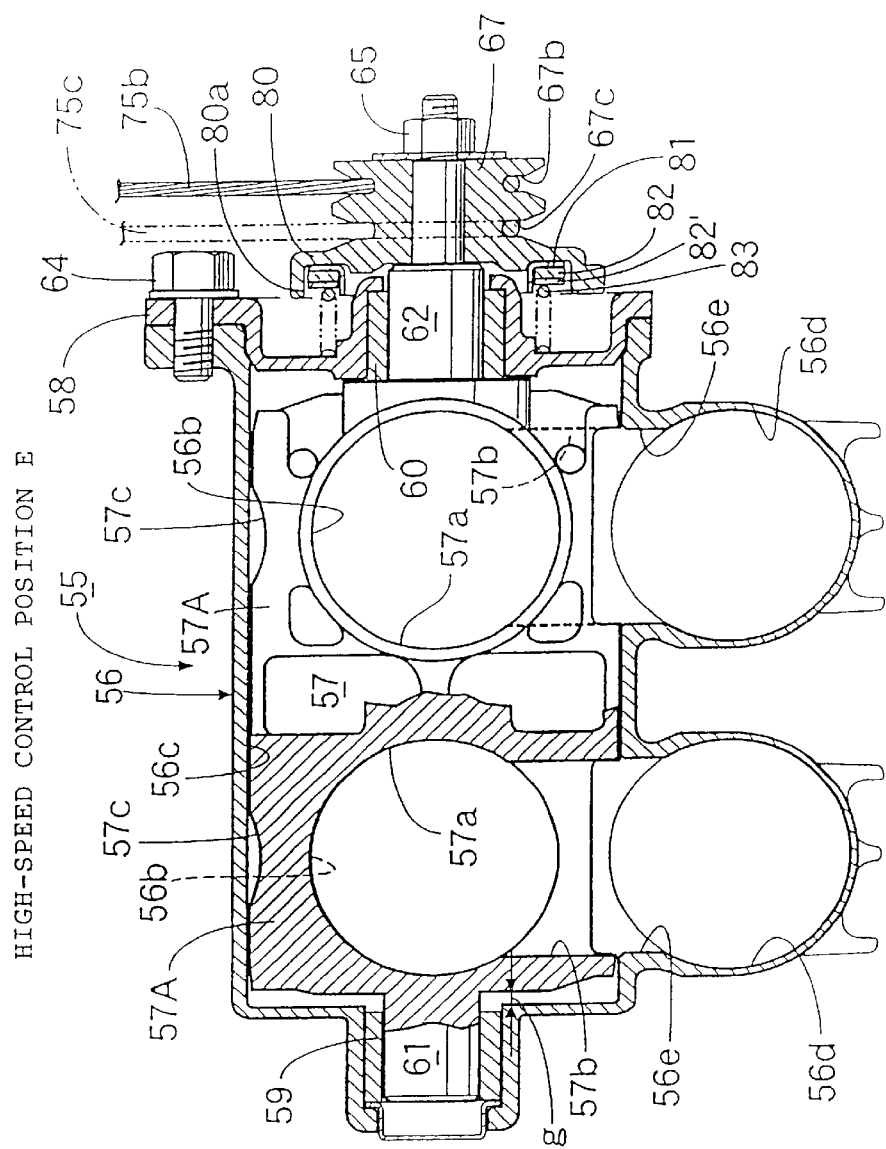
FIG. 12 is a sectional view taken along line 9—9 of FIG. 8 showing an exhaust control valve in its high-speed control position according to an embodiment of the present invention.

FIG. 8 is a side view of an exhaust control device according to an embodiment of the present invention. FIG. 9 is a sectional view taken along line 9—9 of FIG. 8 showing an exhaust control valve in its low-speed control position according to an embodiment of the present invention. FIG. 10 is a sectional view taken along line 10—10 of FIG. 9 according to an embodiment of the present invention. FIG. 11 is a sectional view taken along line 9—9 of FIG. 8 showing an exhaust control valve in its medium-speed control position according to an embodiment of the present invention. FIG. 12 is a sectional view taken along line 9—9 of FIG. 8 showing an exhaust control valve in its high-speed control position according to an embodiment of the present invention.

Figure 13:
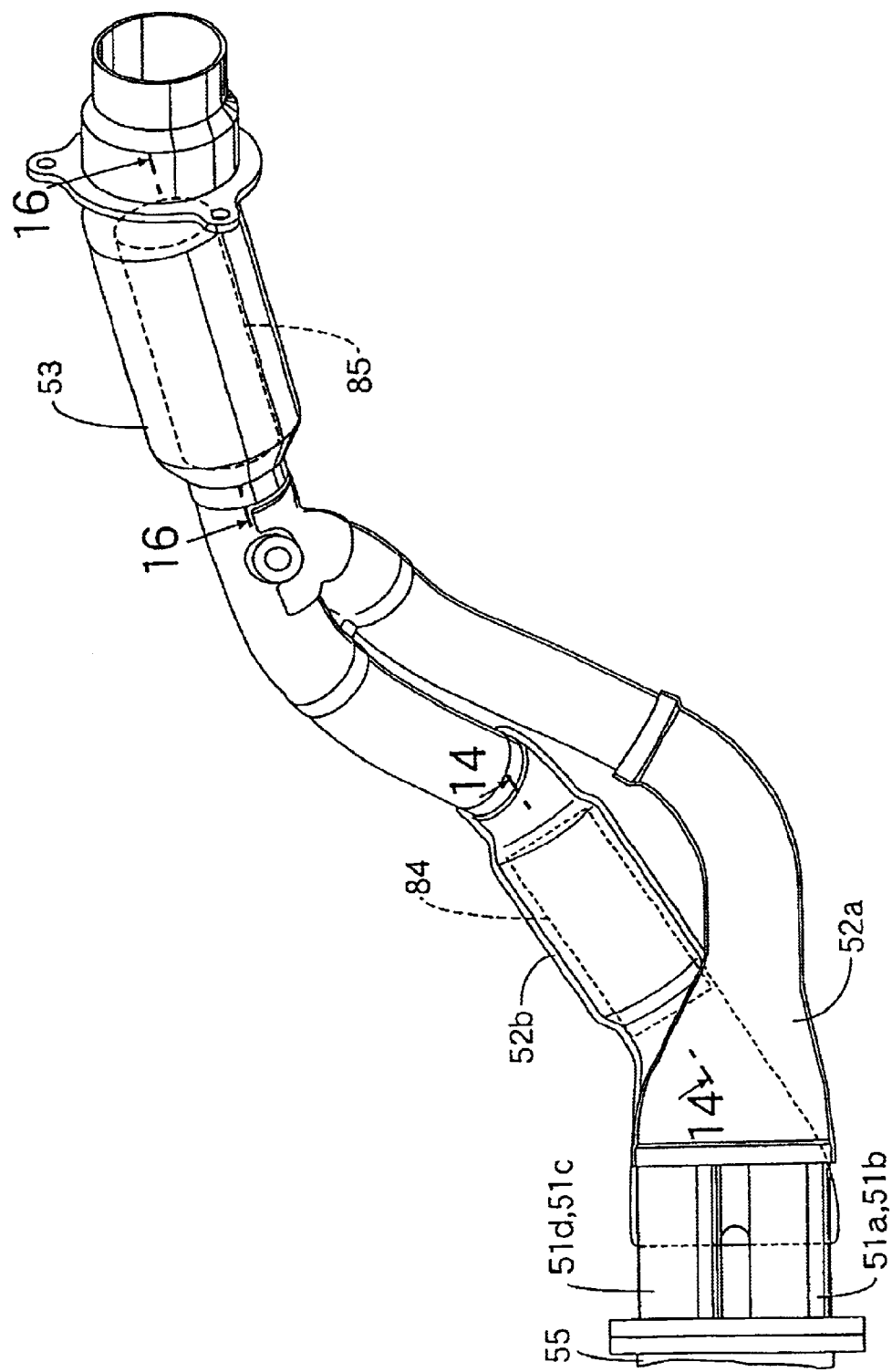
FIG. 13 is an enlarged plan view of a portion of the exhaust system according to an embodiment of the present invention.
Figure 14:
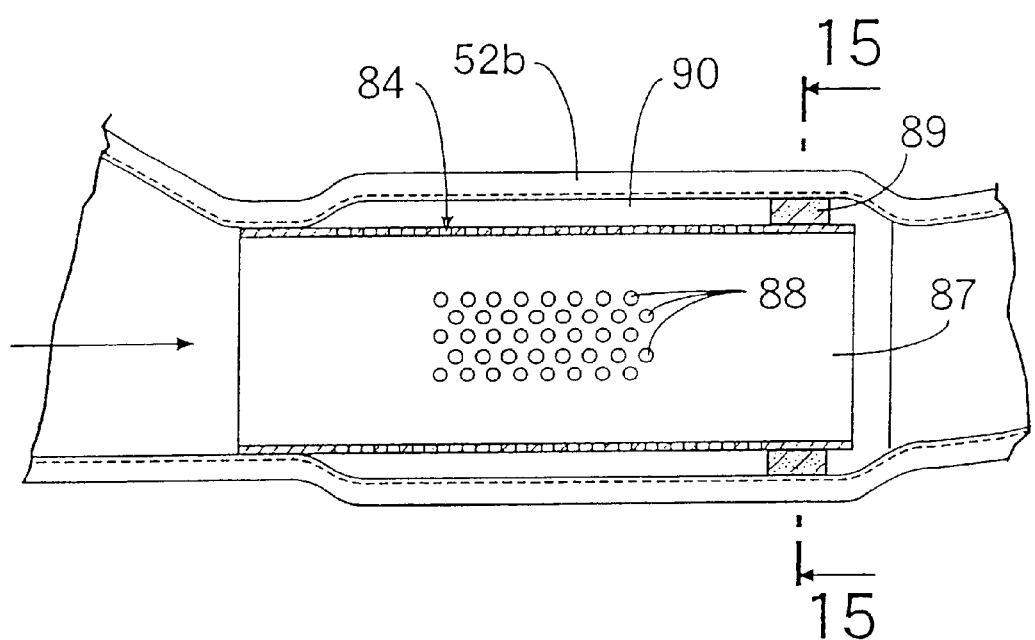
FIG. 14 is a sectional view taken along line 14—14 of FIG. 13 according to an embodiment of the present invention.
Figure 15:
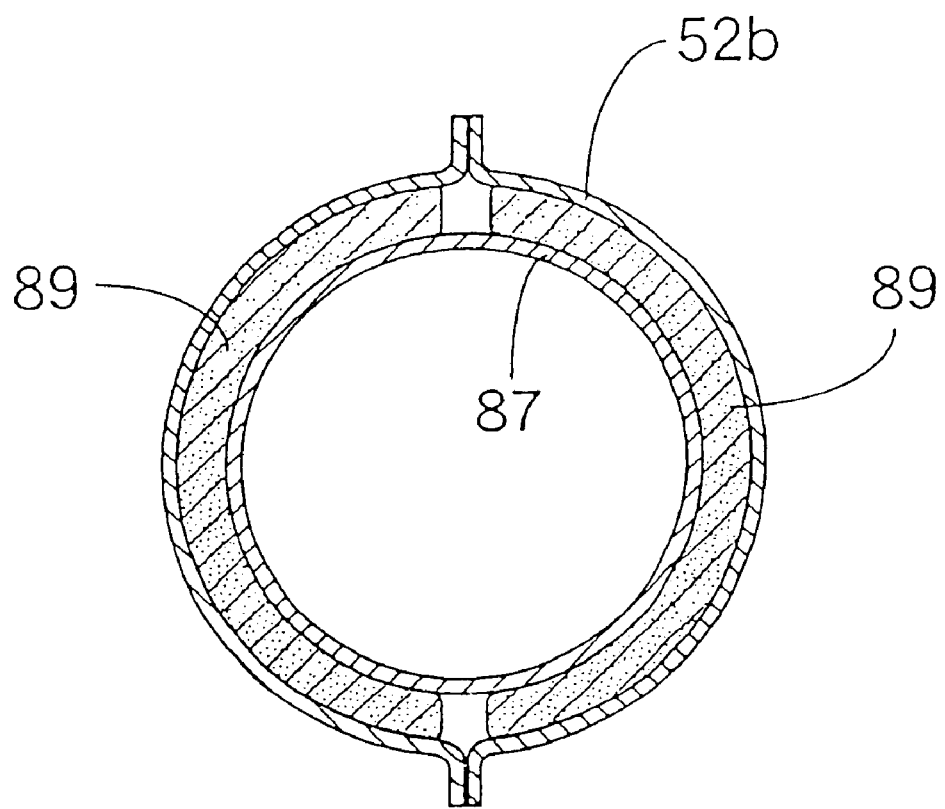
FIG. 15 is a sectional view taken along line 15—15 of FIG. 14 according to an embodiment of the present invention.
Figure 16:
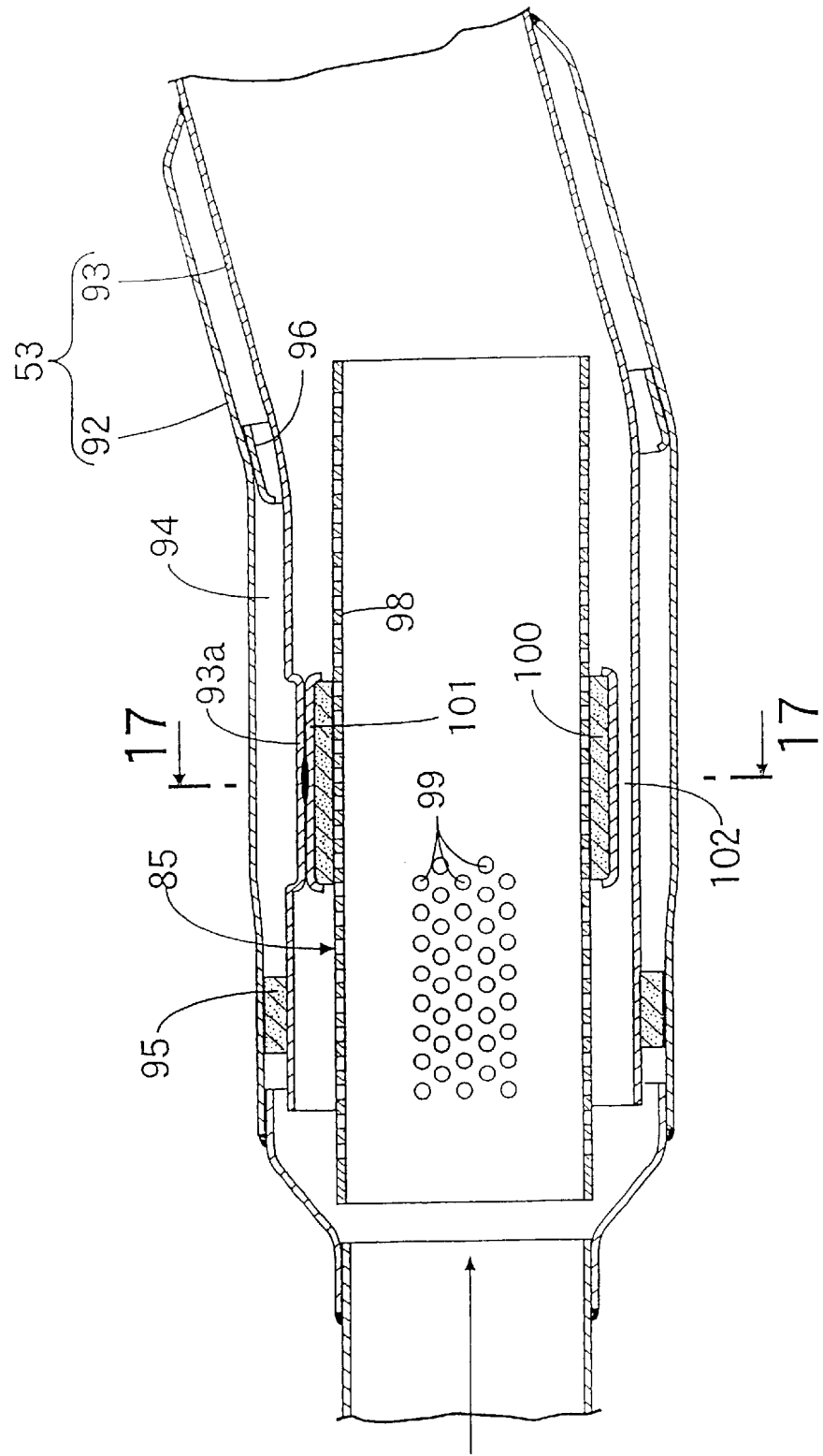
FIG. 16 is a sectional view taken along line 16—16 of FIG. 13 according to an embodiment of the present invention.
Figure 17:
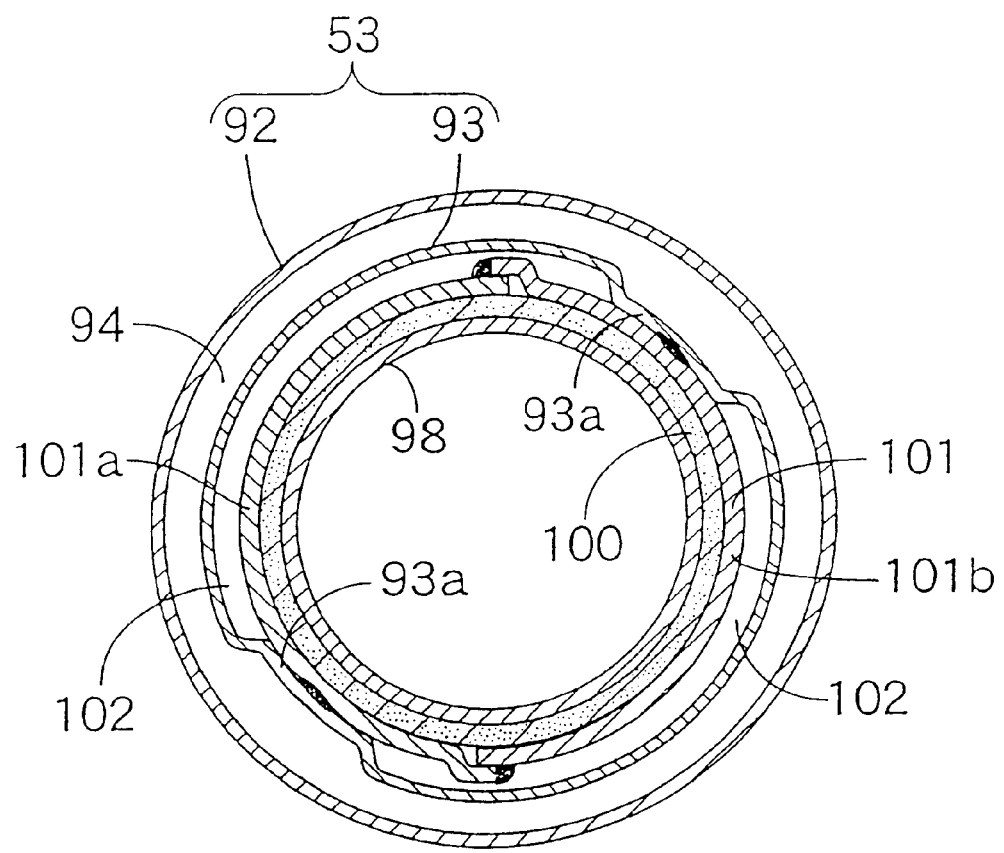
FIG. 17 is a sectional view taken along line 17—17 of FIG. 16 according to an embodiment of the present invention.
Figure 18:
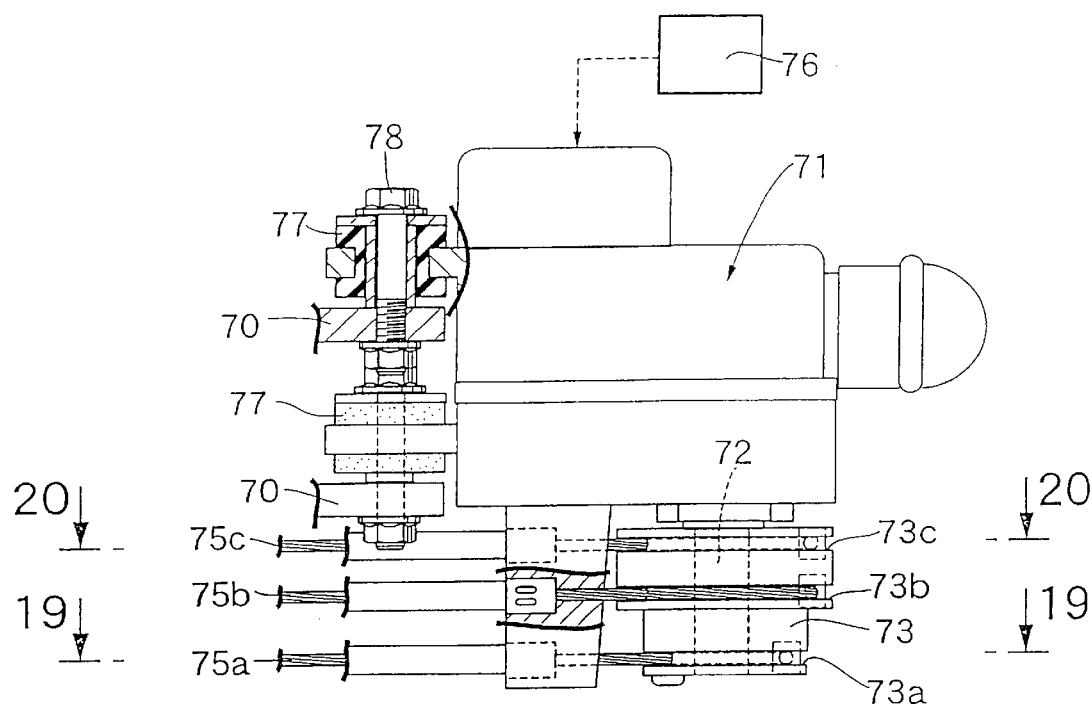
FIG. 18 is a plan view of a driving device for an intake control valve and an exhaust control valve according to an embodiment of the present invention.
Figure 19:
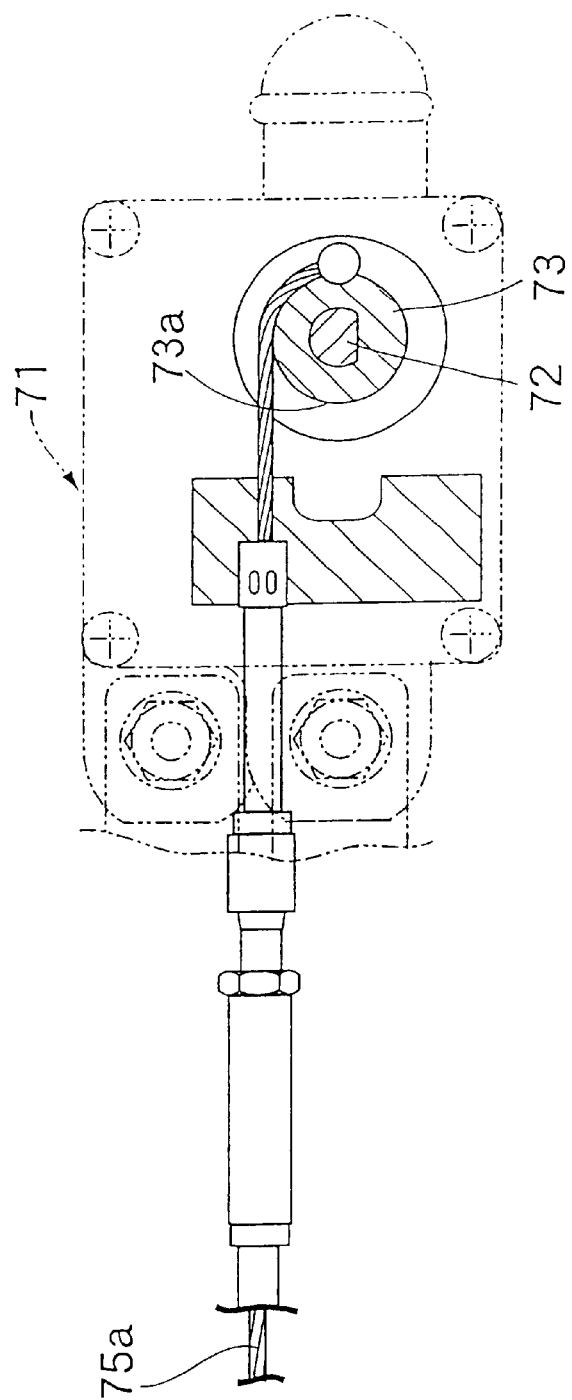
FIG. 19 is a sectional view taken along line 19—19 of FIG. 18 according to an embodiment of the present invention.
Figure 20:
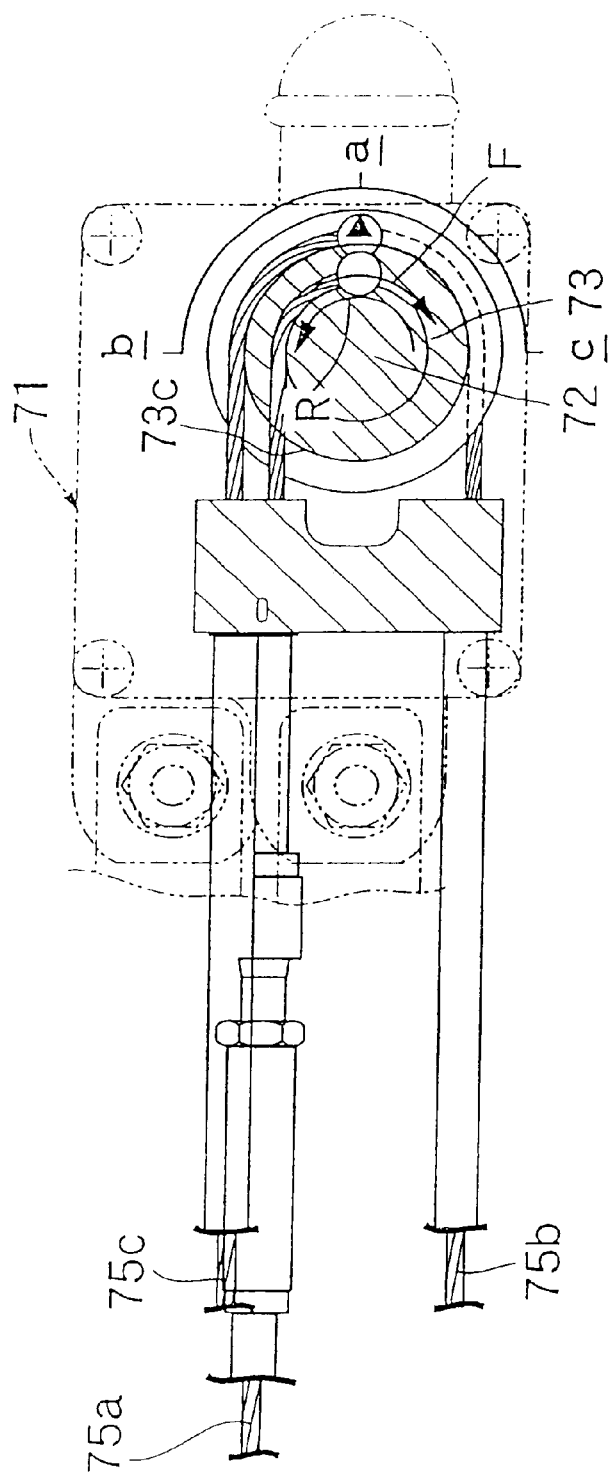
FIG. 20 is a sectional view taken along line 20—20 of FIG. 18 according to an embodiment of the present invention.

FIG. 13 is an enlarged plan view of a portion of the exhaust system according to an embodiment of the present invention. FIG. 14 is a sectional view taken along line 14—14 of FIG. 13 according to an embodiment of the present invention. FIG. 15 is a sectional view taken along line 15—15 of FIG. 14 according to an embodiment of the present invention. FIG. 16 is a sectional view taken along line 16—16 of FIG. 13 according to an embodiment of the present invention. FIG. 17 is a sectional view taken along line 17—17 of FIG. 16 according to an embodiment of the present invention. FIG. 18 is a plan view of a driving device for an intake control valve and an exhaust control valve according to an embodiment of the present invention. FIG. 19 is a sectional view taken along line 19—19 of FIG. 18 according to an embodiment of the present invention. FIG. 20 is a sectional view taken along line 20—20 of FIG. 18 according to an embodiment of the present invention.

In FIG. 1, a vehicle body frame 2 of a motorcycle 1 includes left and right pairs of main frames 4, 4 having a head pipe 3 at their front ends. The left and right pairs of main frames 4,4 slope downward and rearward, and have their rear ends coupled to each other. A seat rail 5 is connected to the rear ends of the main frames 4, 4 and sloping up rearwards, and a parallel four-cylinder engine En is mounted on the pair of main frames 4, 4.

The engine En is mounted within the frame 2 by sloping a cylinder block 8 and a cylinder head 9 a slightly forward with respect to a vehicle longitudinal centerline and inserting the cylinder head 9 between the main frames 4, 4.

A front fork 6f for supporting a front wheel 7f through a shaft is steerably connected to the head pipe 3. A rear fork 6r supporting a rear wheel 7r is vertically connected to a rear portion of a crankcase 10 of the engine En through a pivotal shaft 11. A rear cushion unit 12 is inserted between the rear fork 6r and the main frames 4, 4 thereby permitting oscillatory movement. An output shaft 13 of the engine En mounted on a front side of the pivotal shaft 11 drives the rear wheel 7r through a chain transmission device 14.

A fuel tank 15 is mounted on the main frames 4, 4, and a tandem main seat 16 is fitted to the seat rail 5.

An intake system In of the engine En includes an air cleaner 17 and a throttle body 18 disposed on an upper side of the cylinder head 9 in such a fashion as to be covered with the fuel tank 15. An exhaust system Ex of the engine En includes exhaust pipes 51a to 51d and an exhaust muffler 54 disposed so as to extend from a front side of the cylinder head 9 and the cylinder block 8 through the lower side of the crankcase 10 and slanting in an upward direction.

The intake system In of the engine En according to an embodiment of the present invention will now be described with reference to FIG. 1 to FIG. 6.

As shown in FIG. 1 to FIG. 4, four throttle bodies 18, 18 each corresponding to each of four cylinders are connected to the cylinder head 9 of the engine En. Air funnels 21, 21 are connected to an inlet of an intake path 18a of the throttle bodies 18, 18. A cleaner case 22 of the air cleaner 17 for containing all the air funnels 21, 21 is fitted to the four throttle bodies 18, 18.

The cleaner case 22 includes a lower case half 22b attached to the throttle bodies 18, 18 and an upper case half 22a separately and removably joined to the lower case half 22b by small screws 27. An element fitting plate 25 for partitioning the interior of the cleaner case 22 into a lower dirty air chamber 23 and an upper clean chamber 24 is sandwiched between the case halves 22a and 22b. A cleaner element 26 is fitted within a fitting hole 25a provided in the element fitting plate 25.

An air intake port 28 for opening the dirty air chamber 23 to the atmosphere is provided on one side of the lower case half 22b. The air funnels 21, 21 are arranged to penetrate a bottom wall of the lower case half 22b and their respective inlets open into the clean chamber 24.

Therefore, during operation of the engine En, air flowing through the air intake port 28 into the dirty air chamber 23 is filtered by the cleaner element 26 before passing into the cleaning air chamber 24. Inlet air then flows into the air funnels 21 and throttle bodies 18, and is taken into the engine En at a flow rate controlled by throttle valves 29 positioned within the throttle bodies 18.

In this process, a fuel is injected toward an intake port of the engine En from a fuel injection valve 32 fitted at a side wall of each of the throttle bodies 18.

The throttle valves 29 of all the throttle bodies 18 have valve shafts 29a connected with each other for conjunctive operation. The throttle valves are opened and closed by a throttle grip fitted to a steering handle of the motorcycle 1 through a pulley 30 attached to the valve shaft 29a on its exterior and an operating wire 31 connected to the pulley 30.

The lower case half 22b is provided integrally with a partition wall 34 for partitioning an intermediate portion of the dirty air chamber 23 into a lower small-section passage 33a and an upper large-section passage 33b. An intake control valve 35 for opening and closing the large-section passage 33b is supported by the partition wall 34 through a shaft.

The intake control valve 35 includes a valve plate 36 and a valve shaft 37 formed integrally with a side end of the valve plate 36. The partition wall 34 is provided with one bearing 38 for rotatably supporting one end portion of the valve shaft 37 and a left-right pair of bearings 39, 39 for rotatably supporting the other end portion of the valve shaft 37.

As shown in FIG. 3, the intake control valve 35 is turned between a first intake control position A (See FIG. 2) where the tip end of the valve plate 36 is put into contact with a ceiling surface of the large-section passage 33b to fully close the large-section passage 33b, and a second intake control position B where the valve plate 36 is put in parallel with the partition wall 34 to fully open the passage 33b.

In the case illustrated, the angle of turning is about 45 degrees. In the second intake control position B of the intake control valve 35, the valve plate 36 is in a slanted position with its tip end directed to the upstream side of the large-section passage 33b, and the valve plate 36 is urged toward a closing direction by the intake negative pressure of the engine En.

A return spring 41 is connected to an arm 40 for urging the valve plate 36 in a closing direction, specifically, toward the first intake control position A through the arm 40. The arm 40 is formed integrally with a first end portion of the valve shaft 37. A driven pulley 46 connected through a first transmission wire 75a to a driving pulley 73 of an actuator 71 (described later) between the pair of bearings 39, 39 is fitted to a second end portion of the valve shaft 37.

A lost motion mechanism 42 for coupling the driven pulley 46 and the valve shaft 37 is provided between the driven pulley 46 and the valve shaft 37. The lost motion mechanism 42 includes a transmission pin 43 projecting from a side surface of the valve shaft 37, an arc groove 44 formed in an internal circumferential surface of the driven pulley 46 and extending in the circumferential direction for engaging the transmission pin 43, and a lost motion spring 45 urging the driven pulley 46 toward the first intake control position A of the intake control valve 35.

A center angle of the arc groove 44 is set larger than the angle of opening and closing of the intake control valve 35 so that, when the driven pulley 46 is rotated from a retracted position in the opening direction of the intake control valve 35, namely, toward the second intake control position B, an end surface of the arc groove 44 comes into contact with the transmission pin 43. This action starts moving the intake control valve 35 toward the second intake control position B after a predetermined play angle α is passed.

Next, the exhaust system Ex of the engine En will be described in detail with reference to FIG. 1 and FIG. 7 through FIG. 17.

First, in FIG. 1 and FIG. 7, four parallel cylinders of the engine En will be called No. 1 to No. 4 cylinders 50a to 50d, respectively, as seen from the left side of the vehicle. An ignition sequence for each of the cylinders is carried out according to the sequence of No. 1 cylinder 50a, No. 2 cylinder 50b, No. 4 cylinder 50d and No. 3 cylinder 50c.

No. 1 to No. 4 exhaust pipes 51a to 51d corresponding respectively to the No. 1 to No. 4 cylinders 50a to 50d are connected to a front surface of the cylinder head 9. The exhaust pipes 51a to 51d extend downward from a front surface of the engine En and then bend rearwards at a lower location.

Below the engine En, the No. 1 and No. 4 exhaust pipes 51a and 51d are adjacently disposed on the left and right sides, and the No. 2 and No. 3 exhaust pipes 51b and 51c are adjacently disposed beneath the No. 1 and No. 4 exhaust pipes, respectively. An exhaust control valve 55 is provided at an intermediate portion of the exhaust pipes 51a to 51d.

As shown in FIG. 8 to FIG. 12, the exhaust control valve 55 includes a common valve housing 56 interposed in an intermediate portion of the No. 1 to No. 4 exhaust pipes 51a to 51d, and a valve body 57 mounted in the valve housing 56. The upstream side and the downstream side of the No. 1 to No. 4 exhaust pipes 51a to 51d are connected respectively to front and rear flanges 56A, 56B provided at front and rear ends of the valve housing 56.

The valve housing 56 is provided with pairs of inlet ports 56a, 56a and outlet ports 56b, 56b opening to each end face of the front and rear flanges 56A, 56B and coinciding with the upstream-side and downstream-side pipes of the No. 1 and No. 4 exhaust pipes 51a, 51d. A cylindrical valve chamber 56c is provided between the inlet ports 56a, 56a and the outlet ports 56b, 56b and extending in a direction orthogonal to the axis line of each port.

A pair of communication ports 56d, 56d formed between the front and rear flanges 56A, 56B and coinciding with the upstream-side and downstream-side pipes of the No. 2 and No. 3 exhaust pipes 51b, 51c is also provided in the valve housing 56. A pair of communication holes 56e, 56e for communicating the communication ports 56d, 56d to the valve chamber 56c are provided on the upper side of the communication ports 56d, 56d.

One end of the valve chamber 56c is closed by an end wall integral with the valve housing 56, and a bearing bushing 59 is mounted on the end wall. The other end of the valve chamber 56c is open, and a bearing bracket 58 for closing the other end is fixed to the valve housing 56 by bolts 64. The bearing bracket 58 has a bearing bushing 60 arranged coaxial with the bearing bush 59.

On the other hand, the valve body 57 is rotatably mounted in the valve chamber 56c and is generally cylindrical in shape. At both ends in the axial direction, the valve body 57 is provided integrally with valve shafts 61, 62 that are coaxial with the valve body 57. The valve body 57 having its valve shafts 61, 62 rotatably supported by the bearing bushes 59, 60, is rotated between a low-speed control position C, a medium-speed control position D and a high-speed control position E.

In this case particularly, the bearing bush 60 in the bearing bracket 58 protrudes a little from an internal end face of the bearing bracket 58 so as to support an end face of the valve body 57 also.

In a preferred embodiment, the valve housing 56 is cast from a titanium material, and the valve body 57 also is cast from a titanium material together with the valve shafts 61, 62. On the other hand, the bearing bushes 59, 60 for supporting the valve shafts 61, 62 are formed from a nonmetallic material having excellent bearing properties and excellent sealing properties as well. For example, a carbon material such as carbon graphite is utilized in a preferred embodiment.

A driven pulley 67 is attached by a nut 65 to a tip end portion of the valve shaft 62 protruding to the outside of the bearing bracket 58. The driven pulley 67 is driven by a driving pulley 73 of the actuator 71 (described later), through second and third transmission wires 75b, 75c.

The driven pulley 67 is provided integrally with a flange portion 80 having an annular retaining recess portion 80a opening to the side of the bearing bracket 58. An annular retainer 81 and two thrust washers 82, 82' are retained rotatably relative to the retainer 81 in the retaining recess portion 80a. A thrust spring 83 is compressed and disposed between the thrust washers 82, 82' in a compressed/stored energy position.

The bearing bracket 58 having a certain load from the thrust spring 83 ensures that an end face of the valve body 57 and an end face of the bearing bush 60 are maintained in a pressure contact seal condition. A gap g is formed between opposed end faces of an end wall of the valve housing 56 on the opposite side of the bearing bracket 58 and the valve body 57. Thermal expansion of the valve body 57 in the axial direction is thereby absorbed by the gap g.

The valve body 57 is provided with a pair of through-holes 57a capable of coinciding with the inlet port 56a and the outlet port 56b crossing the axis line of the valve body 57. Communication holes 57b for opening one side face of the through-holes 57a in a radial direction of the valve body 57 are also provided therein.

In a low-speed control position C of the valve body 57 (See FIG. 9 and FIG. 10), the communication hole 57b overlaps with the inlet port 56a of the valve housing 56, while one end side of the through-hole 57a overlaps with the communication hole 56e of the valve housing 56. A valve wall 57A of the valve body 57 opposed to the communication hole 57b closes up the outlet port 56b.

In a medium-speed control position D (See FIG. 11), the through-holes 57a coincide with the inlet and outlet ports 56a, 56b, and the valve wall 57A closes the communication hole 56e. An outer surface of the valve wall 57A is provided with an arc-shaped recess portion 57c connected to an internal circumferential surface of the communication port 56d in the medium-speed control position D (See FIG. 12).

In a high-speed control position E, the through-holes 57a coincide with the inlet and outlet ports 56a, 56b, and the communication hole 57b coincides with the communication hole 56e. Therefore, the medium-speed control position D and the high-speed control position E of the valve body 57 are spaced from each other by about 180 degrees, and the low-speed control position C occurs at a middle point between the control positions D and E.

In FIG. 1, FIG. 7 and FIG. 13, where the No. 1 to No. 4 exhaust pipes 51a to 51d have passed by the exhaust control valve 55, the No. 1 and No. 4 exhaust pipes 51a, 51d are connected to an upper first exhaust collecting pipe 52a for collecting exhaust gases from these pipes. Similarly, the No. 2 and No. 3 exhaust pipes 51b, 51c are connected to a lower first exhaust collecting pipe 52b for collecting exhaust gases therefrom.

Thereafter, the exhaust collecting pipes 52a, 52b are connected to a second exhaust collecting pipe 53 for collecting exhaust gases therefrom, and an exhaust muffler 54 is connected to the rear end of the second exhaust collecting pipe 53. The upper and lower first exhaust collecting pipes 52a, 52b each are provided with exhaust cleaners. The lower first exhaust collecting pipe 52b in communication with the communication port 56d of the exhaust control valve 55 is provided therein with a primary exhaust cleaner 84. The second exhaust collecting pipe 53 is provided therein with a secondary exhaust cleaner 85.

As shown in FIG. 14 and FIG. 15, the primary exhaust cleaner 84 is not limited in its type. In the embodiment shown, the cleaner 84 includes a ternary catalyst converter having a cylindrical catalyst carrier 87 having innumerable through-pores 88 in its peripheral wall. One end portion of the catalyst carrier 87 is fixed by welding to the inner wall of the lower first exhaust collecting pipe 52b. The other end portion is slidably retained on the inner wall through a heat insulating member 89 made from glass wool, steel wool or the like. A cylindrical adiabatic space 90 is formed between the rest intermediate portion of the catalyst carrier 87 and the lower first exhaust collecting pipe 52b.

Therefore, thermal elongation of the primary exhaust cleaner 84 is allowed by slippage between the primary exhaust cleaner 84 and the heat insulating member 89. It is possible to suppress generation of thermal strain in the primary exhaust cleaner 84 and the lower first exhaust collecting pipe 52b. With the heat insulating member 89 and the adiabatic space 90, it is possible to sustain the temperature of the primary exhaust cleaner 84 and to prevent overheating of the lower first exhaust collecting pipe 52b.

As shown in FIG. 16 and FIG. 17, the second exhaust collecting pipe 53 includes an outer pipe 92 connected to an upstream side and an inner pipe 93 connected to the downstream side. The inner pipe 93 is disposed in the inside of the outer pipe 92 with a cylindrical adiabatic space 94 therebetween.

The downstream end of the outer pipe 92 is welded to the outer circumference of the inner pipe 93, and the upstream end of the inner pipe 93 is relatively slidably supported by the outer pipe 92 via a heat insulating member 95 composed of glass wool, steel wool or the like. The second exhaust collecting pipe 53 is slightly bent at its intermediate portion, and a guide ring 96 surrounding the inner pipe 93 is welded to the inner circumferential surface of the outer pipe 92 at the bend portion.

The secondary exhaust cleaner 85 also is not limited to the embodiment shown in the accompanying figures. The preferred embodiment shows a secondary exhaust cleaner 85 having a ternary catalyst converter with a cylindrical catalyst carrier 98 having innumerable through-pores 99 in its circumferential wall. The catalyst carrier 98 is fitted to the inner pipe 93 through a heat insulating member 100 and a retaining ring 101 at a central portion in the axial direction.

The heat insulating member 100 is made of glass wool, steel wool or the like. The retaining ring 101 is formed by overlap welding of opposed end portions of a pair of half-rings 101a, 101b. In this case, a compression force is applied to the heat insulating member 100, whereby a frictional force for slidably retaining the catalyst carrier 98 is produced between the heat insulating member 100 and the catalyst carrier 98.

The inner pipe 93 is provided with a pair of protuberances 93a projecting radially inward and opposed to each other diametrically. The outer circumferential surface of the retaining ring 101 is welded to the protuberances 93a. An adiabatic space 102 is formed at the rest portion other than the welded portions between the retaining ring 101 and the inner pipe 93.

Portions of the catalyst carrier 98 other than the central portion retained by the retaining ring 101 are sufficiently parted away from the inner circumferential surface of the inner pipe 93, so that exhaust gas can be freely circulated in the interior and exterior of the catalyst carrier 98 through the innumerable through-pores 99.

Therefore, a central portion of the secondary exhaust cleaner is slidably supported on the inner pipe 93 through the heat insulating member 100 and the retaining ring 101. Thermal elongation of the secondary exhaust cleaner 85 is allowed by slippage between the secondary exhaust cleaner 85 and the heat insulating member 100. Accordingly, it is possible to suppress generation of thermal strain in the secondary exhaust cleaner 85 and the inner pipe 93.

With this arrangement of the heat insulating member 100, the adiabatic space 102, the inner pipe 93 and the outside adiabatic space 94, it is possible to effectively sustain the temperature of the secondary exhaust cleaner 85 and to prevent overheating of the outer pipe 92. In addition, the secondary exhaust cleaner 85 is supported in one stable position. At portions other than the supported portion, exhaust gas can be circulated in the inside and outside of the catalyst carrier 98 through the through-pores 88, so that cleaning of the exhaust gas can be achieved effectively.

Further, any difference between thermal elongations of the outer pipe 92 and the inner pipe 93 constituting the second exhaust collecting pipe 53 is permitted by slippages between the inner pipe 93, the heat insulating member 95 and the outer pipe 92. In addition, the adiabatic spaces 94, 102 existing doubly between the secondary exhaust cleaner 85 and the outer pipe 92 promise an effective prevention of thermal damage relating to the secondary exhaust cleaner 85.

Next, a driving device for the intake control valve 35 and the exhaust control valve 55 will be described with reference to FIG. 1 and FIG. 18 to FIG. 20.

As shown in FIG. 1 and FIG. 18, on the upper side of the crankcase 10 of the engine En, a common actuator 71 between a pair of brackets 70, 70 is fixed to inside surfaces of the main frame 4 and mounted by a bolt 78 through an elastic member 77. The actuator 71 is disposed in a manner so that a first distance from the actuator 71 to the intake control valve 35 and a second distance from the actuator 71 to the exhaust control valve 55 are nearly equal to each other.

In the embodiment shown, the actuator 71 includes a normally and reversibly rotatable electric motor. The driving pulley 73 attached to an output shaft 72 of the motor is provided with a first wire groove 73a having a small diameter and second and third transmission wire grooves 73b, 73c having a large diameter.

A first transmission wire 75a is engaged with the first wire groove 73a and a wire groove 46a of the driven pulley 46 (See FIG. 6) on the side of the intake control valve 35. End terminals of the first transmission wire 75a are connected to the driving and driven pulleys 73, 46, respectively. Second and third transmission wires 75b, 75c are engaged with the second and third wire grooves 73b, 73c and a pair of wire grooves 67b, 67c of the driven pulley 67 (See FIG. 9) on the side of the exhaust control valve 55 in opposite wrap-around directions. End terminals of the second and third transmission wires 75b, 75c are connected to the driving pulley 73 and the driven pulley 67.

An electronic control unit 76 connected to the actuator 71 determines and detects a low-speed rotation range, an intermediate-speed rotation range and a high-speed rotation range of the engine En based on the revolution rate of the engine En, boost negative pressure and the like inputted from sensors (not shown). The ECU 76 controls the actuator 71 on the basis of the monitored results.

In the medium-speed rotation range of the engine En, the actuator 71 holds the driving pulley 73 in an initial position a. In the low-speed rotation range, the actuator 71 drives the driving pulley 73 to a first driving position b spaced from the initial position a by a predetermined angle along a reverse rotation direction R. In the high-speed rotation range, the actuator 71 drives the driving pulley 73 to a second driving position c spaced from the first driving position b by a predetermined angle in a forward rotation direction F via the initial position a.

Next, operation of a preferred embodiment will be described with reference to the accompanying drawings.

When the driving pulley 73 is driven by the actuator 71 to the first driving position b in the low-speed rotation range of the engine En, the driving pulley 73 pulls the first and second transmission wires 75a, 75b, whereby the driven pulley 46 on the side of the intake control valve 35 is rotated by a predetermined angle in a valve-opening direction (in FIG. 6, counterclockwise). The driven pulley 67 on the side of the exhaust control valve 35 is rotated by a predetermined angle counterclockwise in FIG. 8, thereby resulting in the valve body 57 of the exhaust valve 35 being brought into the low-speed control position C of FIG. 9 and FIG. 10.

However, the rotation by the predetermined angle of the driven pulley 46 is carried out within the range of the play angle α between the driven pulley 73 and the intake control valve 35 in the lost motion mechanism 42. Therefore, the valve plate 36 of the intake control valve 35 is maintained in the first intake control position A by the urging force of the return spring 41.

In this condition of the intake control valve 35, as shown in FIG. 2, the large-section passage 33b is fully closed by the valve plate 36. Therefore, air taken into the engine En is forced to flow through the small-section passage 33a when passing through the air cleaner 17. Therefore, even at the time of an accelerating operation in this low-speed rotation range (when the throttle valve 29 is opened abruptly), dilution of the mixture gas is suppressed, and an appropriately rich mixture gas can be supplied to the engine En. Accordingly, favorable acceleration performance is achieved even during rapid accelerations/starts.

However, when the valve body 57 of the exhaust control valve 55 comes to the low-speed control position C of FIG. 9 and FIG. 10, as has been described hereinabove, the communication hole 57b of the valve body 57 overlaps with the inlet port 56a of the valve housing 56. Further, while one end side of the through-hole 57a of the valve body overlaps with the communication hole 56e of the valve housing 56, the valve wall 57A of the valve body 57 closes up the outlet port 56b.

Therefore, the exhaust gas flowing from the upstream side of the first and fourth exhaust pipes 51a, 51d through the inlet port 56a of the valve housing 56 into the valve chamber 56c is blocked by the valve wall 57A of the valve body 57. Instead, the exhaust gas flowing through the upstream side of the first and fourth exhaust pipes 51a, 51d is turned to the side of the communication port 56d, and joins the exhaust gas flowing from the upstream side of the No. 2 and No. 3 exhaust pipes 51b, 51c and passing through the communication port 56d.

Due to a resulting, increased exhaust resistance, an exhaust pressure suitable for the low-speed rotation range is applied from the exhaust pipes 51a to 51d to the engine En. Therefore, during a valve overlap period, blow-off of fresh gas from the cylinders 50a to 50d to the exhaust system is restrained, and enhancement of low-speed output performance can be achieved.

The exhaust gas passing through the communication port 56d of the valve housing 56 flows through the downstream side of the No. 2 and No. 3 exhaust pipes 51b, 51c into the lower first exhaust collecting pipe 52b. Here, this exhaust gas joins another portion of exhaust gas flow, and is cleaned by the primary exhaust cleaner 84. Therefore, the entire amount of exhaust gas from the engine En flows through the primary exhaust cleaner 84.

Since the primary exhaust cleaner 84 is kept warm as described hereinabove, the primary exhaust cleaner 84 is quickly activated by exhaust heat and reaction heat even immediately after the engine En is started. The exhaust gas which has passed through the lower first exhaust collecting pipe 52b flows into the second exhaust collecting pipe 53, where it is further clarified by the secondary exhaust cleaner 85. Since the secondary exhaust cleaner 85 also is kept warm, activation thereof can be accelerated as well.

Thus, in the low-speed operation range of the engine En, all of the engine's exhaust gas is clarified by the primary and secondary exhaust cleaners 84, 85, so that clarification efficiency can be enhanced even when the exhaust gas temperature is comparatively low.

Meanwhile, the downstream side of the No. 1 and No. 4 exhaust pipes 51a, 51d is closed up by the valve wall 57A of the valve body 57, and the exhaust gas is prevented from flowing into the upper first exhaust collecting pipe 52a, so that it is unnecessary to provide an exhaust cleaner in the upper first exhaust collecting pipe 52a.

Then, when the engine En operates within the medium-speed rotation range and the driving pulley 73 is returned to the initial position a by the actuator 71, the driving pulley 73 relieves the first transmission wire 75a and pulls the third transmission wire 75c. By the relaxation of the first transmission wire 75a, the driven pulley 46 on the side of the intake control valve 35 is only returned to the initial position of FIG. 6 in the range of the play angle α under the urging force of the lost motion spring 45. Therefore, there is no change in the first intake control position A of the intake control valve 35.

However, by the rotation of the driven pulley 67 on the side of the exhaust control valve 35 due to pulling of the third transmission wire 75c, the valve body 57 is brought to the medium-speed control position D of FIG. 11. As a result, as has been described hereinabove, the through-holes 57a of the valve body 57 coincide with the inlet and outlet ports 56a, 56b, and the valve wall 57A closes up the communication hole 56e, so that the No. 1 to No. 4 exhaust pipes 51a, 51d are in an individually conducting condition.

Particularly, the through-holes 57a of the valve body 57 coincide with the No. 1 and No. 4 exhaust pipes 51a, 51d via the inlet port 56a and the outlet port 56b, so that the conduits of the No. 1 and No. 4 exhaust pipes 51a, 51d can be provided with a uniform cross section over the entire length thereof. The arc-shaped recess portions 57c of the outer surface of the valve wall 57A of the valve body 57 fronting on the communication holes 56e of the valve housing 56 are in continuation with the internal circumferential surfaces of the communication ports 56d.

The communication ports 56d are originally made to coincide with the conduits of the No. 2 and No. 3 exhaust pipes 51b, 51c. Therefore, the conduits of the No. 2 and No. 3 exhaust pipes 51b, 51c can be provided with a uniform cross section over the entire length thereof. Accordingly, in the No. 1 to No. 4 exhaust pipes 51a to 51d, it is possible to obtain an effective exhaust inertial effect and/or exhaust pulsation effect by utilizing the entire lengths of the exhaust pipes.

Namely, the effective pipe length of each of the exhaust pipes 51a to 51d is a maximum from the engine En to the upper and lower first exhaust collecting pipes 52a, 52b. The maximum pipe lengths are set so that the exhaust inertia effect and/or exhaust pulsation effect enhances the volumetric efficiency of the engine En in the medium-speed rotation range. Therefore, it is possible to enhance medium-speed output performance of the engine En.

Further, when the engine En operates within the high-speed rotation range and the driving pulley 73 is driven to the second driving position c by the actuator 71, the driving pulley 73 pulls the first and second transmission wires 75a, 75b with a greater force than the remaining operating ranges. By this relatively larger tensile force of the first transmission wire 75a, the driven pulley 46 on the side of the intake control valve 35 is rotated in a valve-opening direction in large excess of the play angle α. This action brings one end wall of the arc groove 44 into contact with the transmission pin 43 of the intake control valve 35, and brings the valve plate 36 of the intake control valve 35 to the second intake control position B of FIG. 3.

Due to the larger tensile force of the second transmission wire 75b, the driven pulley 67 on the side of the exhaust control valve 35 is rotated by about 180 degrees from the medium-speed control position D via the low-speed control position C. This final position is shown as the valve body's 57 high-speed control position E of FIG. 12.

When the valve plate 36 of the intake control valve 35 reaches the second intake control position B, as shown in FIG. 3, the valve plate 36 fully opens the large-section passage 33b, so that air taken into the engine En can flow through both the large-section passage 33b and the small-section passage 33a when passing through the air cleaner 17. Therefore, intake resistance is reduced, and volumetric efficiency of the engine En is enhanced, thereby contributing to enhancement of high-speed output performance.

However, when the valve body 57 of the exhaust control valve 55 reaches the high-speed control position E of FIG. 12, the through-holes 57a of the valve body 57 coincide with the inlet and outlet ports 56a, 56b of the valve housing 56, and the communication holes 57b of the valve body 57 coincide with the communication holes 56e of the valve housing 56, as has been described hereinabove.

Although the communication conditions of the No. 1 to No. 4 exhaust pipes 51a to 51d are not changed, intermediate portions of the No. 1 and No. 4 exhaust pipes 51a, 51d and the No. 2 and No. 3 exhaust pipes 51b, 51c are respectively communicated via the through-holes 56e, 56e and 57b, 57b.

Accordingly, the effective pipe length of each of the exhaust pipes 51a to 51d is minimized from the engine En to the exhaust control valve 55. The minimum effective pipe lengths are set so that the exhaust inertial effect and/or exhaust pulsation effect enhances the volumetric efficiency of the engine En in the high-speed rotation range. Accordingly, it is possible to enhance high-speed output performance of the engine En.

In the medium-speed to high-speed operation ranges of the engine En, the exhaust gases having passed through the No. 1 and No. 4 exhaust pipes 51a, 51d join each other in the upper first exhaust collecting pipe 52a and flow toward the second exhaust collecting pipe 53. Concurrently, the exhaust gases having passed through the No. 2 and No. 3 exhaust pipes 51b, 51c join each other in the lower first exhaust collecting pipe 52b and are cleaned by the primary exhaust cleaner 84, before flowing toward the second exhaust collecting pipe 53.

All the exhaust gases join one another in the second exhaust collecting pipe 53, before being cleaned by the secondary exhaust cleaner 85. Therefore, the exhaust gases having passed through the No. 1 and No. 4 exhaust pipes 51a, 51d are cleaned only by the secondary exhaust cleaner 85. However, this is not problematic since the flow rate of exhaust gas in the medium-speed to high-speed operation ranges is comparatively high, and the cleaning function of the secondary exhaust cleaner 85 is sufficiently enhanced by large quantities of exhaust heat and reaction heat that ensure effective cleaning of the exhaust gas.

The engine's En intake system In and exhaust system Ex are arranged with various functional requirements dependent upon the engine operating speed. Therefore, output performance of the engine En can be effectively enhanced over low-speed to high-speed rotation ranges of the engine En.

When the actuator 71 returns the driving pulley 73 from the second driving position c to the first driving position b again, the driven pulley 46 and the valve plate 36 of the intake control valve 35 are returned to the first intake control position A of FIG. 2. This is accomplished by urging forces of the lost motion spring 45 and the return spring 41 at around the time when the exhaust control valve 35 is brought from the high-speed control position E to the low-speed control position located at an intermediate point. Thereafter, the driven pulley 46 can continue a returning rotation in the range of the play angle α of the lost motion mechanism 42, and the exhaust control valve 35 can rotate past the low-speed control position to the medium-speed control position D.

Therefore, even if there is a large difference between the rotation angle of the intake control valve 35 and that of the exhaust control valve 55, the difference is absorbed by the lost motion mechanism 42. Accordingly, both the control valves 35, 55 can be properly operated by the common actuator 71.

The rotation of the driving pulley 73 which operates the exhaust control valve 35 between the low-speed control position and the medium-speed control position D is absorbed by the lost motion mechanism 42, thereby eliminating deleterious effects on the intake control valve 35 located at the first intake control position A.

Therefore, the valve body 57 of the exhaust control valve 55 can be operated freely between the low-speed control position C, medium-speed control position D and high-speed control position E. By providing the common actuator 71 for both the intake and exhaust control valves 35 and 55, the structure of a driving system for the control valves 35 and 55 is simplified. This further achieves enhancement of engine performance, reduction of cost, and reduction in weight.

Meanwhile, in the exhaust control valve 55, the bearing bushing 60 on the side of the driven pulley 67 of the valve housing 56, as has been described hereinabove, not only supports the valve shaft 62 on one side of the valve body 57, but also receives one end face of the valve body 57 urged to the side of the bearing bushing 60 by the load of the thrust spring 83. Therefore, the bearing bushing 60 and the valve body 57 are maintained in a pressure contact seal condition.

The portion between the valve body 57 and the bearing bushing 60 can be sealed without using any special seal member, and leakage of exhaust gas from the vicinity of the valve shaft 62 can be prevented. In addition, since expensive seal members are unnecessary, the number of component parts is reduced and cost reductions can be achieved. Furthermore, the absence of seal members allows a bearing bushing 60 longer in the axial direction to be mounted in the bearing bracket 58 in order to achieve a large bearing capacity for bearing the valve shaft 62 in a broad range.

Therefore, the bearing bushing 60 can firmly support the valve shaft 62 and can display excellent durability even though it directly receives load from the driven pulley 67 fitted to the valve shaft 62.

Where the bearing bushing 60, particularly on the side of pressure contact with one end face of the valve body 57, is formed from a nonmetallic material such as carbon graphite, good sealing property can be attained. Further, vibrations in the thrust direction of the valve body 57 due to exhaust pulsation can be absorbed, whereby generation of abnormal noise can be suppressed.

Furthermore, the valve housing 56 and the valve body 57 provided integrally with the valve shafts 61, 62 are formed from a titanium material, which greatly contributes to reduction of weight of the exhaust control valve. In addition, though the titanium material forming the valve body 57 is an active metal and normally has a high tendency toward seizure, the adoption of the bearing bushings 59, 60 made of a carbon material ensure that good rotational movement can be provided between the valve shafts 61, 62 and the bearing bushes 59, 60 in even high-temperature conditions. This arrangement, in cooperation with the reduction of weight of the valve body 57, permits an enhanced response to driving torque.

The coaxial cylindrical shape of the valve body 57 and the valve shafts 61, 62 ensures good distribution of melt from a central portion of the shaft end at the time of casting. At the same time, thermal deformation due to partial material thickness can be prevented.

In addition, finishing by cutting the external peripheral surfaces of the valve body 57 and the valve shafts 61, 62 can be carried out continuously after casting, so that the valve body 57 is produced with high precision.

The high-precision valve body 57 thus obtained can have its external peripheral surface in uniform contact with the internal surface of the valve housing 56, so that leakage of exhaust gas at the contact area can be restrained effectively, and appropriate exhaust control can be achieved.

Since the cylindrical valve body 57 has good weight balance about its rotational axis line, it is possible to achieve a reduction in the driving torque for the valve body 57 and, eventually an enhancement of system response to the driving torque. Also, partial loading on the bearing bushings 59, 60 can be minimized, whereby durability of the bearing bushes 59, 60 can be enhanced.

The present invention is not limited to or by the embodiments above, and various design modifications can be made without departure from the spirit and scope of the invention.

For example, the intake control valve 35 can be so constructed that the effective pipe length of the intake system In is changed according to the operating condition of the engine En. The invention can also be applied to a two-cylinder engine, where the two exhaust pipes are controlled by the exhaust control valve 55 in the same manner as the No. 1 and No. 4 exhaust pipes 51a, 51d and the No. 2 and No. 3 exhaust pipes 51b, 51c in the above embodiment. Naturally, the invention can be applied also to other multi-cylinder engines.

As has been described hereinabove, according to an embodiment of the present invention, an exhaust control valve having a valve housing, and a valve body rotatably contained in a valve chamber of the valve housing to cooperate with the valve housing for controlling the flow of exhaust gas, with a transmission member for rotationally driving a valve shaft of the valve body rotatably borne by bearing bushes mounted in the valve housing being fitted to one end of the valve shaft, the valve body is formed in a cylindrical shape coaxial with the axis line of the valve shaft, and the valve body and the valve shaft are formed as one body by casting.

With the present invention, a valve body with high precision can be produced efficiently. The high-precision valve body can have uniform contact with the internal surface of the valve housing, whereby leakage of exhaust gas at the contact area can be restrained effectively. Accordingly, appropriate exhaust control can be achieved.

In addition, since the cylindrical valve body has good weight balance about its rotational axis, it is possible to achieave a reduction in the driving torque for the valve body. Therefore, an improved system response to the driving torque is achieved. Also, partial loading on the bearing bushings can be minimized, whereby durability of the bearing bushes can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust control valve comprising:
    a valve housing having a valve chamber, said valve chamber being disposed between pairs of inlet and outlet ports of said valve housing and extending in a direction orthogonal to an axial direction of each of said ports;
    a valve body having a cylindrical shape with respect to an axial direction of said valve body, rotatably contained in the valve chamber and cooperatively engaged with said valve housing for controlling a flow of exhaust gas, wherein said valve body has a uniform construction with a one-piece, cast body;
    a transmission member rotationally driving at least one valve shaft of said valve body; and
    a plurality of bearing bushings mounted in said valve housing and rotatably supporting each valve shaft, said valve body and an axial centerline of each valve shaft being coaxially arranged along a common axis, wherein each valve shaft has a uniform construction with a one-piece, cast body.

2. The exhaust control valve according to claim 1, wherein a driven pulley connected to at least one drive shaft is drivingly engaged through said transmission member, said transmission member having a second and a third transmission wire operatively connected with an actuator.

3. The exhaust control valve according to claim 2, further comprising a bearing bracket having a spring load from a thrust spring, said spring load maintaining a pressure seal, direct contact condition between an end face of the valve body and an end face of each bearing bushing.

4. An exhaust control valve comprising:
    a valve housing having a valve chamber, said valve housing being provided with pairs of inlet ports and outlet ports opening to each end face of front and rear flanges of said valve housing;
    a valve body having a cylindrical shape with respect to an axial direction of said valve body, rotatably contained in the valve chamber and cooperatively engaged with said valve housing for controlling a flow of exhaust gas;
    a transmission member rotationally driving at least one valve shaft of said valve body;
    a plurality of bearing bushings mounted in said valve housing and rotatably supporting each valve shaft, said valve body and an axial centerline of each of the valve shafts being coaxially arranged along a common axis; and
    a bearing bracket having a spring load from a thrust spring, said spring load maintaining a pressure seal, direct contact condition between an end face of the valve body and an end face of each bearing bushing,
    wherein said valve body and each of the valve shafts have a uniform construction with a one-piece, unitary cast body.

5. The exhaust control valve according to claim 4, said valve housing having at least one pair of inlet ports and at least one pair of outlet ports.

6. The exhaust control valve according to claim 5, wherein at least one drive shaft has a driven pulley attached to a tip end portion of the valve shaft.

7. The exhaust control valve according to claim 6, wherein the driven pulley is driven by a driving pulley of an actuator.

8. The exhaust control valve according to claim 7, wherein the actuator is operatively engaged and controls an intake control system and said exhaust control valve.

9. An exhaust control system for an internal combustion engine of a vehicle comprising:
    a plurality of exhaust pipes from the internal combustion engine containing an exhaust gas flow, said exhaust pipes each having an intermediate portion;
    a common valve housing interposed in the intermediate portions of said exhaust pipes, the valve housing having at least one pair of inlet ports, at least one pair of outlet ports, and a valve chamber, said common valve housing having an axial direction orthogonal to an axial direction of said exhaust pipes;
    a valve body having a cylindrical shape with respect to an axial direction of said valve body, rotatably mounted within the valve chamber, and cooperatively engaged with said valve housing for controlling a flow of exhaust gas;
    a transmission member rotationally driving a pair of valve shafts of said valve body; and
    a plurality of bearing bushings mounted in said valve housing and rotatably supporting each valve shaft, said valve body an axial centerline of each of the valve shafts being coaxially arranged along a common axis,
    wherein said valve body and each of the valve shafts have a uniform construction with a one-piece, unitary cast body.

10. The exhaust control system according to claim 9 further comprising:

a plurality of front and rear flanges at front and rear ends of the valve housing, respectively; and an exhaust gas muffler.

11. The exhaust control system according to claim 9, herein at least one drive shaft has a driven pulley attached to a tip end portion of the valve shaft.

12. The exhaust control system according to claim 11, wherein the driven pulley is driven by a driving pulley of an actuator.

13. The exhaust control system according to claim 9, wherein a driven pulley connected to at least one drive shaft is drivingly engaged through said transmission member, said transmission member having a second and a third transmission wire operatively connected with an actuator.

14. The exhaust control system according to claim 13, wherein the actuator is operatively engaged and simultaneously controls an intake control system and said exhaust control system.

15. The exhaust control system according to claim 14, further comprising a bearing bracket having a spring load from a thrust spring, said spring load maintaining a pressure contact seal condition between an end face of the valve body and an end face of each bearing bushing.

16. An exhaust control system for an internal combustion engine of a vehicle comprising:

a plurality of exhaust pipes from the internal combustion engine containing an exhaust gas flow, said exhaust pipes each having an intermediate portion;

a common valve housing interposed in the intermediate portions of said exhaust pipes, the valve housing having at least one pair of inlet ports, at least one pair of outlet ports, and a valve chamber, said common valve housing having an axial direction orthogonal to an axial direction of said exhaust pipes, and said valve chamber being mounted in an upper portion of the common valve housing so as to be interposed in the intermediate portions of said exhaust pipes having uppermost positions;

a valve body having a cylindrical shape with respect to an axial direction of said valve body, rotatably mounted within the valve chamber, and cooperatively engaged with said valve housing for controlling a flow of exhaust gas;

a transmission member rotationally driving at least one valve shaft of said valve body;

a plurality of bearing bushings mounted in said valve housing and rotatably supporting each valve shaft, said valve body and an axial centerline of each of the valve shafts being coaxially arranged along a common axis, the axial centerline of each of the valve shafts being arranged substantially perpendicular to the axial direction of the exhaust pipes; and a bearing bracket having a spring load from a thrust spring, said spring load maintaining a pressure seal, direct contact condition between an end face of the valve body and an end face of each bearing bushing.

* * * * *